US012557934B2

(12) United States Patent　　　　(10) Patent No.: US 12,557,934 B2

Bilton et al.　　　　　　　　　　　(45) Date of Patent: *Feb. 24, 2026

(54) ADDITIVE CONTAINER WITH BOTTOM COVER

(71) Applicant: SharkNinja Operating LLC, Needham, MA (US)

(72) Inventors: Simon Lewis Bilton, Leamington Spa (GB); Joseph Butler, Rugby (GB); Timothy Christopher Stubbs, Birmingham (GB)

(73) Assignee: SharkNinja Operating LLC, Needham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,422

(22) Filed: Dec. 12, 2023

(65) Prior Publication Data

US 2024/0315479 A1　　Sep. 26, 2024

Related U.S. Application Data

(63) Continuation of application No. 18/124,905, filed on Mar. 22, 2023, now Pat. No. 11,871,867.

(51) Int. Cl.

| | |
|---|---|
| *A47J 31/40* | (2006.01) |
| *A23L 2/54* | (2006.01) |
| *A47J 31/46* | (2006.01) |
| *B01F 23/2361* | (2022.01) |
| *B01F 23/237* | (2022.01) |

(52) U.S. Cl.

CPC ................. *A47J 31/40* (2013.01); *A23L 2/54* (2013.01); *A47J 31/461* (2018.08); *B01F*

23/2361 (2022.01); *B01F 23/237621* (2022.01); *A23V 2250/11* (2013.01)

(58) Field of Classification Search

None

See application file for complete search history.

(56) References Cited

U.S. PATENT DOCUMENTS

| | | |
|---|---|---|
| 236,478 A | 1/1881 | Ball et al. |
| 494,483 A | 3/1893 | Malmstrom |
| | (Continued) | |

FOREIGN PATENT DOCUMENTS

| | | |
|---|---|---|
| AU | 2014241782 A1 | 9/2015 |
| AU | 2012293327 C1 | 3/2016 |
| | (Continued) | |

OTHER PUBLICATIONS

European Search Report received for European Patent Application No. 23209898.8, mailed on Apr. 23, 2024, 4 pages.

(Continued)

*Primary Examiner* — John J Norton

(74) *Attorney, Agent, or Firm* — Mintz, Levin, Cohn, Ferris, Glovsky and Popeo, P.C.

(57) ABSTRACT

Containers are provided for use with a beverage dispensing device. The container can include a housing defining a hollow interior and having an opening leading to the hollow interior, a cover coupled disposed over the opening, an inlet leading to the hollow interior, and an outlet spaced apart from the interior. The inlet and outlet can each have valves movable between open and closed positions for allowing fluid flow into and out of the hollow interior.

12 Claims, 19 Drawing Sheets

(56) References Cited

U.S. PATENT DOCUMENTS

| | | | |
|---|---|---|---|
| 916,654 A | 3/1909 | Barwis |
| 1,242,493 A | 10/1917 | Stringham |
| 1,420,773 A | 6/1922 | Stainbrook |
| 2,400,955 A | 5/1946 | Leo |
| 2,402,132 A | 6/1946 | Goldberg |
| 2,548,241 A | 4/1951 | Reynolds et al. |
| 3,179,292 A | 4/1965 | Terry |
| 3,357,601 A | 12/1967 | Crawford et al. |
| 3,419,193 A | 12/1968 | Stewart et al. |
| 3,596,809 A | 8/1971 | Taubenheim |
| 3,752,362 A | 8/1973 | Risener |
| 3,923,183 A | 12/1975 | Choksi et al. |
| 4,030,634 A | 6/1977 | Osborn |
| 4,062,466 A | 12/1977 | Conti |
| 4,073,294 A | 2/1978 | Stanley et al. |
| 4,103,803 A | 8/1978 | Irvine |
| 4,153,181 A | 5/1979 | Parker et al. |
| 4,174,743 A | 11/1979 | Beny et al. |
| 4,190,169 A | 2/1980 | Pehr |
| 4,211,342 A | 7/1980 | Jamgochian et al. |
| 4,212,414 A | 7/1980 | Beyens |
| 4,251,473 A | 2/1981 | Gilbey |
| 4,323,090 A | 4/1982 | Magi |
| 4,323,171 A | 4/1982 | Whorton et al. |
| 4,392,588 A | 7/1983 | Scalera |
| 4,408,701 A | 10/1983 | Jeans |
| 4,411,369 A | 10/1983 | Borows |
| 4,436,227 A | 3/1984 | Johnson, Jr. et al. |
| 4,518,541 A | 5/1985 | Harris |
| 4,533,068 A | 8/1985 | Meierhoefer |
| 4,555,371 A | 11/1985 | Jeans |
| 4,558,484 A | 12/1985 | Groth |
| 4,561,656 A | 12/1985 | David |
| 4,567,993 A | 2/1986 | Albrecht et al. |
| 4,676,287 A | 6/1987 | Fitzwater |
| 4,706,847 A | 11/1987 | Sankey et al. |
| 4,726,494 A | 2/1988 | Scott |
| 4,752,138 A | 6/1988 | Rufer |
| 4,836,414 A | 6/1989 | Credle, Jr. et al. |
| 4,866,324 A | 9/1989 | Yuzawa et al. |
| 5,003,790 A | 4/1991 | Goupil |
| 5,038,976 A | 8/1991 | McMillin |
| 5,045,077 A | 9/1991 | Blake, III |
| 5,102,010 A | 4/1992 | Osgar et al. |
| RE33,969 E | 6/1992 | Richter |
| 5,128,574 A | 7/1992 | Koizumi et al. |
| 5,156,871 A | 10/1992 | Goulet et al. |
| 5,170,912 A | 12/1992 | Du |
| 5,185,007 A | 2/1993 | Middaugh et al. |
| 5,199,609 A | 4/1993 | Ash, Jr. |
| 5,205,440 A | 4/1993 | Matsushita |
| 5,219,185 A | 6/1993 | Oddenino |
| 5,299,608 A | 4/1994 | Bosyj |
| 5,330,154 A | 7/1994 | Mashburn et al. |
| 5,390,854 A | 2/1995 | Hench |
| 5,415,329 A | 5/1995 | Westlund |
| 5,425,404 A | 6/1995 | Dyer |
| 5,495,725 A | 3/1996 | Middlemiss |
| 5,507,436 A | 4/1996 | Ruttenberg |
| 5,526,853 A | 6/1996 | McPhee et al. |
| 5,540,355 A | 7/1996 | Hancock et al. |
| 5,549,228 A | 8/1996 | Brown |
| 5,573,046 A | 11/1996 | Venooker et al. |
| 5,638,991 A | 6/1997 | Todden et al. |
| 5,642,761 A | 7/1997 | Holbrook |
| 5,651,482 A | 7/1997 | Sizemore |
| 5,697,115 A | 12/1997 | Sciarra et al. |
| 5,803,320 A | 9/1998 | Cutting et al. |
| 5,816,448 A | 10/1998 | Kobold |
| 5,836,483 A | 11/1998 | Disel |
| 5,842,682 A | 12/1998 | Schennum et al. |
| 5,862,948 A | 1/1999 | Duchon et al. |
| 5,865,474 A | 2/1999 | Takahashi |
| 5,870,944 A | 2/1999 | Vander et al. |
| 5,884,679 A | 3/1999 | Hansen et al. |
| 5,897,033 A | 4/1999 | Okawa et al. |
| 5,901,880 A | 5/1999 | Clarke |
| 5,924,606 A | 7/1999 | Huizing |
| 5,947,171 A | 9/1999 | Woodruff |
| 5,960,701 A | 10/1999 | Reese et al. |
| 5,971,179 A | 10/1999 | Christmas et al. |
| 5,975,164 A | 11/1999 | Whaley et al. |
| 5,996,620 A | 12/1999 | Bensley |
| 6,012,596 A | 1/2000 | Oglesbee et al. |
| 6,014,970 A | 1/2000 | Ivri et al. |
| 6,081,962 A | 7/2000 | Kasen et al. |
| 6,082,586 A | 7/2000 | Banks |
| 6,092,569 A | 7/2000 | Simmel et al. |
| 6,095,677 A | 8/2000 | Karkos, Jr. et al. |
| 6,142,750 A | 11/2000 | Benecke |
| 6,158,486 A | 12/2000 | Olson et al. |
| 6,167,586 B1 | 1/2001 | Reed, Jr. et al. |
| 6,170,543 B1 | 1/2001 | Simmel et al. |
| 6,179,167 B1 | 1/2001 | Boot et al. |
| 6,209,753 B1 | 4/2001 | Ohu |
| 6,223,791 B1 | 5/2001 | Arsenault et al. |
| 6,257,453 B1 | 7/2001 | Graham |
| 6,269,837 B1 | 8/2001 | Arent et al. |
| 6,276,560 B1 | 8/2001 | Belcastro |
| 6,283,330 B1 | 9/2001 | Gillespie et al. |
| 6,321,941 B1 | 11/2001 | Argentieri et al. |
| 6,325,115 B1 | 12/2001 | Cowland et al. |
| 6,336,603 B1 | 1/2002 | Karkos, Jr. et al. |
| 6,363,235 B1 | 3/2002 | Chiesa et al. |
| 6,386,392 B1 | 5/2002 | Argentieri et al. |
| 6,390,335 B1 | 5/2002 | Lawson et al. |
| 6,427,730 B2 | 8/2002 | Nagel et al. |
| 6,450,214 B1 | 9/2002 | Dyer et al. |
| 6,488,058 B1 | 12/2002 | Dyer et al. |
| 6,601,734 B1 | 8/2003 | Smith |
| 6,609,732 B1 | 8/2003 | Souvatzidis et al. |
| 6,672,477 B2 | 1/2004 | Miller et al. |
| 6,672,481 B2 | 1/2004 | Ziesel |
| 6,685,056 B1 | 2/2004 | Argentieri et al. |
| 6,688,499 B2 | 2/2004 | Zhang |
| 6,712,497 B2 | 3/2004 | Jersey et al. |
| 6,735,811 B2 | 5/2004 | Field et al. |
| 6,758,372 B2 | 7/2004 | Studer et al. |
| 6,771,925 B2 | 8/2004 | Satoh |
| 6,820,763 B2 | 11/2004 | Bilskie et al. |
| 6,832,706 B2 | 12/2004 | Hearld et al. |
| 6,866,164 B2 | 3/2005 | Branson et al. |
| 6,893,180 B2 | 5/2005 | Hall et al. |
| 6,923,345 B1 | 8/2005 | Laible |
| 6,951,295 B1 | 10/2005 | Gaus et al. |
| 6,971,549 B2 | 12/2005 | Leifheit et al. |
| 6,973,945 B2 | 12/2005 | Haimi |
| 7,051,399 B2 | 5/2006 | Field et al. |
| 7,051,888 B2 | 5/2006 | Antier et al. |
| 7,083,071 B1 | 8/2006 | Crisp, III et al. |
| 7,097,074 B2 | 8/2006 | Halliday et al. |
| 7,104,531 B2 | 9/2006 | Page et al. |
| 7,108,156 B2 | 9/2006 | Fox |
| 7,114,707 B2 | 10/2006 | Rona et al. |
| 7,121,437 B2 | 10/2006 | Kasting |
| 7,121,438 B2 | 10/2006 | Hoepner et al. |
| 7,131,556 B2 | 11/2006 | Tseng |
| 7,134,575 B2 | 11/2006 | Vogel et al. |
| 7,140,519 B1 | 11/2006 | Kiser |
| 7,156,247 B2 | 1/2007 | Laburu |
| 7,156,324 B2 | 1/2007 | Birrenkott et al. |
| 7,163,127 B2 | 1/2007 | Seelhofer |
| 7,165,568 B2 | 1/2007 | Kessell et al. |
| 7,165,695 B2 | 1/2007 | Choi |
| 7,178,743 B2 | 2/2007 | Clarke, III et al. |
| 7,213,506 B2 | 5/2007 | Halliday et al. |
| 7,219,598 B2 | 5/2007 | Halliday et al. |
| 7,231,869 B2 | 6/2007 | Halliday et al. |
| 7,246,724 B2 | 7/2007 | Dave |
| 7,255,039 B2 | 8/2007 | Halliday et al. |
| 7,287,461 B2 | 10/2007 | Halliday et al. |
| 7,288,276 B2 | 10/2007 | Rona et al. |
| 7,305,986 B1 | 12/2007 | Steiner et al. |
| 7,316,178 B2 | 1/2008 | Halliday et al. |

(56) References Cited

U.S. PATENT DOCUMENTS

| | | | |
|---|---|---|---|
| 7,322,277 | B2 | 1/2008 | Halliday et al. |
| 7,328,815 | B2 | 2/2008 | Lowe |
| 7,364,702 | B2 | 4/2008 | Hoffman et al. |
| 7,383,966 | B2 | 6/2008 | Ziesel |
| 7,407,117 | B2 | 8/2008 | Dodd |
| 7,418,899 | B2 | 9/2008 | Halliday et al. |
| 7,445,133 | B2 | 11/2008 | Ludovissie et al. |
| 7,458,486 | B2 | 12/2008 | Weist et al. |
| 7,510,095 | B2 | 3/2009 | Comeau et al. |
| 7,513,192 | B2 | 4/2009 | Sullivan et al. |
| 7,533,439 | B2 | 5/2009 | Theiss, Jr. et al. |
| 7,533,603 | B2 | 5/2009 | Halliday et al. |
| 7,533,604 | B2 | 5/2009 | Halliday et al. |
| 7,544,289 | B2 | 6/2009 | Straka et al. |
| 7,578,415 | B2 | 8/2009 | Ziesel et al. |
| 7,592,027 | B2 | 9/2009 | Halliday et al. |
| 7,607,385 | B2 | 10/2009 | Halliday et al. |
| 7,607,591 | B2 | 10/2009 | Barch et al. |
| 7,617,954 | B2 | 11/2009 | Skillin |
| 7,621,426 | B2 | 11/2009 | Reynolds et al. |
| 7,644,843 | B1 | 1/2010 | Bush et al. |
| 7,648,049 | B1 | 1/2010 | Lassota |
| 7,651,002 | B2 | 1/2010 | Hennemann et al. |
| 7,669,737 | B2 | 3/2010 | Bethuy et al. |
| 7,669,738 | B1 | 3/2010 | Byers |
| 7,673,558 | B2 | 3/2010 | Panesar et al. |
| 7,681,492 | B2 | 3/2010 | Suggi et al. |
| 7,686,441 | B2 | 3/2010 | Hashii et al. |
| 7,690,392 | B1 | 4/2010 | Sarkiss |
| 7,703,381 | B2 | 4/2010 | Liverani et al. |
| 7,731,066 | B2 | 6/2010 | Norris et al. |
| 7,731,161 | B2 | 6/2010 | Seiwert et al. |
| 7,735,665 | B2 | 6/2010 | Robinson |
| 7,762,438 | B2 | 7/2010 | Skillin |
| 7,770,758 | B2 | 8/2010 | Le Maner |
| 7,780,043 | B2 | 8/2010 | Jourdin et al. |
| 7,784,311 | B2 | 8/2010 | Santoemma et al. |
| 7,789,273 | B2 | 9/2010 | Kadyk et al. |
| 7,806,294 | B2 | 10/2010 | Gatipon et al. |
| 7,819,381 | B2 | 10/2010 | Abe |
| 7,823,756 | B2 | 11/2010 | Alley |
| 7,832,593 | B2 | 11/2010 | Raterman et al. |
| 7,837,132 | B2 | 11/2010 | Mazooji et al. |
| 7,841,491 | B2 | 11/2010 | Contiero |
| 7,849,872 | B2 | 12/2010 | Phillips et al. |
| 7,854,354 | B2 | 12/2010 | Laible |
| 7,857,910 | B2 | 12/2010 | Carhuff et al. |
| 7,896,203 | B2 | 3/2011 | Myron |
| 7,975,881 | B1 | 7/2011 | Glucksman et al. |
| 7,975,883 | B2 | 7/2011 | Laib et al. |
| 7,975,988 | B2 | 7/2011 | Thomson et al. |
| 7,980,421 | B2 | 7/2011 | Ophardt et al. |
| 8,006,853 | B2 | 8/2011 | Delage |
| 8,006,866 | B2 | 8/2011 | Minard et al. |
| 8,020,733 | B2 | 9/2011 | Snodgrass |
| 8,052,257 | B2 | 11/2011 | Gonzales |
| 8,074,837 | B2 | 12/2011 | Nevarez et al. |
| 8,083,100 | B2 | 12/2011 | Minard et al. |
| 8,087,347 | B2 | 1/2012 | Halliday et al. |
| 8,087,545 | B2 | 1/2012 | Ciavarella et al. |
| 8,113,384 | B2 | 2/2012 | Bethuy et al. |
| 8,172,453 | B2 | 5/2012 | Boussemart et al. |
| 8,210,736 | B2 | 7/2012 | Raber |
| 8,282,268 | B2 | 10/2012 | Karkos, Jr. et al. |
| 8,292,101 | B1 | 10/2012 | Bragg et al. |
| 8,317,050 | B2 | 11/2012 | Hollis et al. |
| 8,376,173 | B2 | 2/2013 | Britto et al. |
| 8,376,182 | B2 | 2/2013 | Lepage |
| 8,381,925 | B2 | 2/2013 | Skillin et al. |
| 8,403,179 | B1 | 3/2013 | Gerber |
| 8,430,134 | B2 | 4/2013 | Gill |
| 8,434,639 | B2 | 5/2013 | Markert |
| 8,448,804 | B2 | 5/2013 | Luburic |
| 8,479,950 | B2 | 7/2013 | Ophardt et al. |
| 8,517,212 | B2 | 8/2013 | Antal, Sr. |
| 8,523,025 | B2 | 9/2013 | Skillin et al. |
| 8,544,692 | B2 | 10/2013 | Rusch et al. |
| 8,555,774 | B2 | 10/2013 | Patera et al. |
| 8,584,578 | B2 | 11/2013 | Koopman et al. |
| 8,590,746 | B2 | 11/2013 | Bethuy et al. |
| 8,616,412 | B2 | 12/2013 | Bethuy et al. |
| 8,621,990 | B2 | 1/2014 | Fang et al. |
| 8,635,740 | B2 | 1/2014 | Gordon et al. |
| 8,651,333 | B2 | 2/2014 | Metropulos et al. |
| 8,661,966 | B2 | 3/2014 | Stearns et al. |
| 8,668,376 | B2 | 3/2014 | Krauchi et al. |
| 8,677,888 | B2 | 3/2014 | Santoiemmo |
| 8,685,477 | B2 | 4/2014 | Almblad et al. |
| 8,690,026 | B2 | 4/2014 | Richards |
| 8,727,515 | B2 | 5/2014 | Dowell et al. |
| 8,733,566 | B2 | 5/2014 | Druitt et al. |
| 8,746,506 | B2 | 6/2014 | Jersey et al. |
| 8,757,227 | B2 | 6/2014 | Girard et al. |
| 8,757,452 | B2 | 6/2014 | Richards |
| 8,770,094 | B2 | 7/2014 | Rithener et al. |
| 8,794,126 | B2 | 8/2014 | Skalski et al. |
| 8,807,392 | B2 | 8/2014 | Smeller et al. |
| 8,807,824 | B2 | 8/2014 | Bodum |
| 8,820,577 | B2 | 9/2014 | Rusch et al. |
| 8,826,688 | B2 | 9/2014 | Tachibana et al. |
| 8,833,241 | B2 | 9/2014 | Santoiemmo |
| 8,833,584 | B2 | 9/2014 | Groubert |
| 8,833,586 | B2 | 9/2014 | Meyer et al. |
| 8,840,092 | B2 | 9/2014 | Kumar et al. |
| 8,844,555 | B2 | 9/2014 | Schneider |
| 8,846,121 | B2 | 9/2014 | Hansen et al. |
| 8,863,991 | B2 | 10/2014 | Cleary et al. |
| 8,887,958 | B2 | 11/2014 | Kadyk et al. |
| 8,887,959 | B2 | 11/2014 | Hill et al. |
| 8,889,203 | B2 | 11/2014 | York |
| 8,916,215 | B2 | 12/2014 | Yoakim et al. |
| 8,919,240 | B2 | 12/2014 | Ozanne et al. |
| 8,919,669 | B2 | 12/2014 | Sandahl |
| 8,960,500 | B2 | 2/2015 | Van Opstal et al. |
| 8,960,506 | B2 | 2/2015 | Beilke et al. |
| 8,985,395 | B2 | 3/2015 | Tansey |
| 8,985,396 | B2 | 3/2015 | Jersey et al. |
| 8,985,561 | B2 | 3/2015 | Hatherell |
| 8,993,018 | B2 | 3/2015 | Bucher et al. |
| 8,998,035 | B2 | 4/2015 | Ford |
| 9,010,237 | B2 | 4/2015 | Ozanne et al. |
| 9,026,245 | B2 | 5/2015 | Tilton et al. |
| 9,027,466 | B2 | 5/2015 | Bucher et al. |
| 9,044,718 | B2 | 6/2015 | Ludwig et al. |
| 9,045,722 | B2 | 6/2015 | Reif et al. |
| 9,051,162 | B2 | 6/2015 | Peters et al. |
| 9,051,167 | B2 | 6/2015 | Burge et al. |
| 9,056,287 | B2 | 6/2015 | Peltola et al. |
| 9,060,650 | B2 | 6/2015 | De' Longhi |
| 9,073,673 | B2 | 7/2015 | Mazurkiewicz et al. |
| 9,084,510 | B2 | 7/2015 | Scorrano et al. |
| 9,107,448 | B2 | 8/2015 | Giardino et al. |
| 9,107,449 | B2 | 8/2015 | Njaastad et al. |
| 9,107,533 | B2 | 8/2015 | Volz et al. |
| 9,114,368 | B2 | 8/2015 | Njaastad et al. |
| 9,155,330 | B1 | 10/2015 | Shtivelman |
| 9,155,418 | B2 | 10/2015 | Lai et al. |
| 9,156,670 | B2 | 10/2015 | Hill et al. |
| 9,161,654 | B2 | 10/2015 | Belmont |
| 9,166,448 | B2 | 10/2015 | Lam et al. |
| 9,167,935 | B2 | 10/2015 | Scholvinck et al. |
| 9,169,048 | B2 | 10/2015 | Ludewigs et al. |
| 9,193,506 | B2 | 11/2015 | Madison et al. |
| 9,233,824 | B2 | 1/2016 | Alan et al. |
| 9,290,317 | B2 | 3/2016 | Quinn et al. |
| 9,295,278 | B2 | 3/2016 | Nowak |
| 9,320,382 | B2 | 4/2016 | Lo Faro et al. |
| 9,320,385 | B2 | 4/2016 | Spiegel et al. |
| 9,334,090 | B1 | 5/2016 | Maple et al. |
| 9,352,897 | B2 | 5/2016 | Hoshino |
| 9,364,018 | B1 | 6/2016 | Peterson et al. |
| 9,371,176 | B2 | 6/2016 | Kohli et al. |
| 9,375,686 | B2 | 6/2016 | Boarman et al. |
| 9,388,033 | B2 | 7/2016 | Gates |

(56) References Cited

U.S. PATENT DOCUMENTS

| | | | |
|---|---|---|---|
| 9,396,605 B2 | 7/2016 | Righetti |
| 9,409,680 B2 | 8/2016 | Van Alfen et al. |
| 9,409,757 B2 | 8/2016 | Reddy |
| 9,409,759 B2 | 8/2016 | Wilder et al. |
| 9,433,317 B2 | 9/2016 | Agon et al. |
| 9,433,328 B2 | 9/2016 | Ciavarella et al. |
| 9,434,532 B2 | 9/2016 | Yoakim et al. |
| 9,440,836 B2 | 9/2016 | Quittner et al. |
| 9,445,688 B2 | 9/2016 | Flick |
| 9,458,003 B1 | 10/2016 | Laible |
| 9,469,463 B2 | 10/2016 | Murray et al. |
| 9,481,508 B2 | 11/2016 | Oh |
| 9,486,102 B2 | 11/2016 | Baldo |
| 9,493,298 B2 | 11/2016 | Evans et al. |
| 9,504,348 B2 | 11/2016 | Windler et al. |
| 9,505,510 B2 | 11/2016 | Hatherell |
| 9,516,969 B2 | 12/2016 | Weflen |
| 9,521,924 B2 | 12/2016 | Priley et al. |
| 9,527,047 B2 | 12/2016 | Ring et al. |
| 9,538,876 B2 | 1/2017 | Ozanne et al. |
| D779,046 S | 2/2017 | Tansey, Jr. |
| 9,580,216 B2 | 2/2017 | Wisniewski |
| 9,582,699 B2 | 2/2017 | Jarisch et al. |
| 9,593,005 B2 | 3/2017 | Jersey et al. |
| 9,617,138 B2 | 4/2017 | Mosimann et al. |
| 9,630,157 B2 | 4/2017 | Li et al. |
| 9,651,188 B2 | 5/2017 | Green et al. |
| 9,661,951 B2 | 5/2017 | Bugnano et al. |
| 9,664,264 B2 | 5/2017 | Kristlbauer |
| 9,668,604 B2 | 6/2017 | Yoakim et al. |
| 9,669,973 B2 | 6/2017 | Hoshino et al. |
| 9,687,796 B2 | 6/2017 | Hoare et al. |
| 9,701,527 B2 | 7/2017 | Tansey, Jr. |
| 9,708,109 B2 | 7/2017 | Marina et al. |
| 9,714,162 B2 | 7/2017 | Hecht et al. |
| 9,717,366 B2 | 8/2017 | Nevin et al. |
| 9,718,035 B2 | 8/2017 | Bandixen et al. |
| 9,723,863 B2 | 8/2017 | Njaastad et al. |
| 9,730,547 B2 | 8/2017 | Tanner et al. |
| 9,743,801 B2 | 8/2017 | Leuzinger et al. |
| 9,745,120 B2 | 8/2017 | Abegglen et al. |
| 9,745,185 B2 | 8/2017 | Klopfenstein et al. |
| 9,751,054 B2 | 9/2017 | Jin et al. |
| 9,754,437 B2 | 9/2017 | Deo et al. |
| 9,770,129 B2 | 9/2017 | Remo et al. |
| 9,783,403 B2 | 10/2017 | Tansey, Jr. |
| 9,783,405 B2 | 10/2017 | Olson et al. |
| 9,788,681 B2 | 10/2017 | Perentes et al. |
| 9,790,076 B2 | 10/2017 | Novak et al. |
| 9,796,506 B2 | 10/2017 | Meager |
| 9,801,500 B2 | 10/2017 | Ven Der Woning |
| 9,809,437 B2 | 11/2017 | Tansey, Jr. |
| 9,811,704 B2 | 11/2017 | Kaeser |
| 9,821,951 B2 | 11/2017 | Estabrook et al. |
| 9,821,992 B2 | 11/2017 | Rudick et al. |
| 9,854,935 B2 | 1/2018 | Danieli et al. |
| 9,889,239 B2 | 2/2018 | Michaels et al. |
| 9,889,966 B2 | 2/2018 | Medeiros et al. |
| 9,896,322 B2 | 2/2018 | Hecht |
| 9,897,220 B2 | 2/2018 | Cohen et al. |
| 9,907,432 B2 | 3/2018 | Tanner et al. |
| 9,918,586 B2 | 3/2018 | Smith et al. |
| 9,957,145 B2 | 5/2018 | Cohen et al. |
| 9,974,410 B2 | 5/2018 | Ferrier |
| 9,980,596 B2 | 5/2018 | Rognon et al. |
| 9,981,801 B2 | 5/2018 | Ozanne et al. |
| 9,999,315 B2 | 6/2018 | Crarer et al. |
| 9,999,316 B2 | 6/2018 | Ye et al. |
| 10,000,370 B2 | 6/2018 | Bethuy et al. |
| 10,007,397 B2 | 6/2018 | Besson et al. |
| 10,017,372 B2 | 7/2018 | Bethuy et al. |
| 10,022,011 B2 | 7/2018 | Norton et al. |
| 10,028,614 B2 | 7/2018 | Perentes et al. |
| 10,034,573 B2 | 7/2018 | Flick et al. |
| 10,046,903 B2 | 8/2018 | Evans et al. |
| 10,046,904 B2 | 8/2018 | Evans et al. |
| 10,051,988 B2 | 8/2018 | Gordon et al. |
| 10,058,826 B2 | 8/2018 | Cohen et al. |
| 10,064,513 B2 | 9/2018 | Rehfuss |
| 10,070,751 B2 | 9/2018 | Magniet et al. |
| 10,076,208 B2 | 9/2018 | Castellani et al. |
| 10,080,461 B2 | 9/2018 | Bugnano et al. |
| 10,093,530 B2 | 10/2018 | Mackey et al. |
| 10,099,443 B1 | 10/2018 | Evans et al. |
| 10,106,392 B2 | 10/2018 | Peirsman et al. |
| 10,117,539 B2 | 11/2018 | Rognon et al. |
| 10,117,540 B2 | 11/2018 | De Vreede et al. |
| 10,130,211 B2 | 11/2018 | Bugnano et al. |
| 10,131,528 B2 | 11/2018 | Webster et al. |
| 10,131,529 B2 | 11/2018 | Jersey et al. |
| 10,136,755 B2 | 11/2018 | Talon |
| 10,143,782 B2 | 12/2018 | Yurek et al. |
| 10,143,978 B2 | 12/2018 | Tipton |
| 10,149,569 B2 | 12/2018 | Preshel |
| 10,155,647 B2 | 12/2018 | Foster et al. |
| 10,159,376 B2 | 12/2018 | Dovat et al. |
| 10,160,575 B2 | 12/2018 | Ray |
| 10,165,892 B2 | 1/2019 | Lafosse |
| 10,189,614 B2 | 1/2019 | Pruiett |
| 10,193,411 B2 | 1/2019 | Tajima et al. |
| 10,201,171 B2 | 2/2019 | Gordon et al. |
| 10,201,785 B2 | 2/2019 | Cohen et al. |
| 10,206,533 B2 | 2/2019 | Pirone |
| 10,211,438 B2 | 2/2019 | Ohashi et al. |
| 10,213,033 B2 | 2/2019 | Bratsch et al. |
| 10,213,752 B2 | 2/2019 | Shalev |
| 10,214,018 B2 | 2/2019 | Nozawa et al. |
| 10,227,226 B2 | 3/2019 | Jersey et al. |
| 10,229,401 B2 | 3/2019 | Yoakim |
| 10,231,569 B2 | 3/2019 | Perentes et al. |
| 10,233,002 B2 | 3/2019 | Baenninger et al. |
| 10,239,669 B2 | 3/2019 | Ayriss et al. |
| 10,258,186 B2 | 4/2019 | Rivera |
| 10,280,060 B2 | 5/2019 | Van Opstal et al. |
| 10,294,020 B2 | 5/2019 | Nordqvist et al. |
| 10,307,718 B2 | 6/2019 | Waisman |
| 10,329,134 B2 | 6/2019 | Olson et al. |
| 10,334,871 B2 | 7/2019 | Van De Sluis et al. |
| 10,336,597 B2 | 7/2019 | Griscik et al. |
| 10,343,885 B2 | 7/2019 | Novak et al. |
| 10,349,773 B2 | 7/2019 | Segiet et al. |
| 10,350,561 B1 | 7/2019 | Dushine et al. |
| 10,358,269 B2 | 7/2019 | Cerveny |
| 10,364,089 B2 | 7/2019 | Daniels, Jr. et al. |
| 10,365,141 B2 | 7/2019 | Freiburger et al. |
| 10,370,235 B2 | 8/2019 | Pellaud |
| 10,377,540 B2 | 8/2019 | Borgardt et al. |
| 10,377,620 B2 | 8/2019 | Makino et al. |
| 10,384,839 B2 | 8/2019 | Yamaguchi |
| 10,398,254 B2 | 9/2019 | Tinkler et al. |
| 10,399,769 B2 | 9/2019 | Talon et al. |
| 10,399,838 B2 | 9/2019 | Green |
| 10,399,839 B2 | 9/2019 | Knoll et al. |
| 10,405,690 B2 | 9/2019 | Tentorio |
| 10,405,691 B2 | 9/2019 | Hesselbrock et al. |
| 10,414,557 B2 | 9/2019 | Skillin et al. |
| 10,414,642 B2 | 9/2019 | Melville, Jr. et al. |
| 10,433,668 B2 | 10/2019 | Merali et al. |
| 10,433,671 B2 | 10/2019 | Surface |
| 10,442,591 B2 | 10/2019 | Rognard et al. |
| 10,455,968 B1 | 10/2019 | Singer |
| 10,455,973 B2 | 10/2019 | Dollner et al. |
| 10,455,974 B2 | 10/2019 | Talon |
| 10,456,539 B2 | 10/2019 | Hearn et al. |
| 10,456,757 B1 | 10/2019 | Blichmann |
| 10,457,450 B2 | 10/2019 | Rios |
| 10,470,605 B2 | 11/2019 | Ergican et al. |
| 10,479,669 B2 | 11/2019 | Kim et al. |
| 10,485,374 B2 | 11/2019 | Lo Faro et al. |
| 10,486,953 B2 | 11/2019 | Pellaud et al. |
| 10,488,097 B2 | 11/2019 | Nachawati et al. |
| 10,494,246 B2 | 12/2019 | Hecht et al. |
| 10,506,896 B2 | 12/2019 | Ven Der Woning |
| 10,507,958 B2 | 12/2019 | Hashimoto et al. |

(56) References Cited

U.S. PATENT DOCUMENTS

| | | | |
|---|---|---|---|
| 10,513,424 B2 | 12/2019 | Tansey, Jr. | |
| 10,518,938 B2 | 12/2019 | Suzuki et al. | |
| 10,518,942 B2 | 12/2019 | Seibert et al. | |
| 10,519,020 B2 | 12/2019 | Ozawa et al. | |
| 10,524,617 B2 | 1/2020 | Perrin et al. | |
| 10,526,186 B2 | 1/2020 | Kuboi et al. | |
| 10,526,192 B2 | 1/2020 | Holley et al. | |
| 10,543,977 B2 | 1/2020 | Brockman et al. | |
| 10,548,430 B2 | 2/2020 | Guard et al. | |
| 10,555,636 B2 | 2/2020 | Carr et al. | |
| 10,562,700 B2 | 2/2020 | Weijers et al. | |
| 10,568,452 B2 | 2/2020 | Fin et al. | |
| 10,595,549 B2 | 3/2020 | Van De Sluis et al. | |
| 10,595,668 B2 | 3/2020 | Tinkler et al. | |
| 10,596,305 B2 | 3/2020 | Roberts et al. | |
| 10,604,310 B2 | 3/2020 | Kutsuzawa et al. | |
| 10,604,398 B2 | 3/2020 | Smeller et al. | |
| 10,618,705 B1 | 4/2020 | Laible | |
| 10,631,686 B2 | 4/2020 | Abdo et al. | |
| 10,647,564 B2 | 5/2020 | Showalter | |
| 10,654,700 B2 | 5/2020 | Hecht | |
| 10,674,857 B2 | 6/2020 | Lyons et al. | |
| 10,674,863 B2 | 6/2020 | Sevcik et al. | |
| 10,676,336 B2 | 6/2020 | Makino et al. | |
| 10,682,007 B2 | 6/2020 | Fischer | |
| 10,682,593 B2 | 6/2020 | Baird | |
| 10,702,835 B2 | 7/2020 | Tran et al. | |
| 10,702,838 B2 | 7/2020 | Chaussin et al. | |
| 10,703,618 B2 | 7/2020 | Ziesel | |
| 10,707,734 B2 | 7/2020 | Holenstein et al. | |
| 10,710,864 B2 | 7/2020 | Jangbarwala et al. | |
| 10,717,567 B2 | 7/2020 | Sakamoto et al. | |
| 10,717,637 B2 | 7/2020 | Pellaud et al. | |
| 10,743,707 B2 | 8/2020 | Bugnano et al. | |
| 10,759,594 B2 | 9/2020 | Mills et al. | |
| 10,765,254 B2 | 9/2020 | Totti et al. | |
| 10,766,756 B2 | 9/2020 | Gatipon et al. | |
| 10,772,460 B2 | 9/2020 | Accursi | |
| 10,780,408 B2 | 9/2020 | Schöb et al. | |
| 10,791,752 B2 | 10/2020 | Siegel et al. | |
| 10,793,346 B2 | 10/2020 | Bartoli et al. | |
| 10,800,581 B2 | 10/2020 | Berroa Garcia | |
| 10,807,049 B2 | 10/2020 | Abdo et al. | |
| 10,807,853 B2 | 10/2020 | Balstad et al. | |
| 10,813,501 B2 | 10/2020 | Helf et al. | |
| 10,820,741 B2 | 11/2020 | Byun et al. | |
| 10,820,744 B2 | 11/2020 | Rubin et al. | |
| 10,820,745 B2 | 11/2020 | Zwicker et al. | |
| 10,820,746 B2 | 11/2020 | Noth | |
| 10,827,875 B2 | 11/2020 | Noth | |
| 10,828,586 B2 | 11/2020 | Simpson et al. | |
| 10,829,359 B2 | 11/2020 | Von Kraus et al. | |
| 10,842,313 B2 | 11/2020 | Novak et al. | |
| 10,843,142 B2 | 11/2020 | Waggoner et al. | |
| 10,843,849 B1 | 11/2020 | Berge | |
| 10,843,866 B2 | 11/2020 | Cafaro et al. | |
| 10,846,975 B2 | 11/2020 | Tansey, Jr. et al. | |
| 10,849,451 B2 | 12/2020 | Su | |
| 10,849,454 B2 | 12/2020 | Gordon et al. | |
| 10,869,572 B2 | 12/2020 | Blatt | |
| 10,870,566 B2 | 12/2020 | Green et al. | |
| 10,882,728 B2 | 1/2021 | Hong et al. | |
| 10,883,072 B2 | 1/2021 | Hong et al. | |
| 10,893,773 B2 | 1/2021 | Standaar et al. | |
| 10,894,639 B2 | 1/2021 | Pruiett | |
| 10,894,706 B2 | 1/2021 | Totti et al. | |
| 10,898,026 B2 | 1/2021 | Fin | |
| 10,899,600 B2 | 1/2021 | Frieburger et al. | |
| 10,905,287 B2 | 2/2021 | Tu et al. | |
| 10,906,013 B2 | 2/2021 | Cohen et al. | |
| 10,918,238 B2 | 2/2021 | Bhutani et al. | |
| 10,918,239 B2 | 2/2021 | Hartmann et al. | |
| 10,919,752 B2 | 2/2021 | Breault | |
| 10,925,433 B2 | 2/2021 | Hansen et al. | |
| 10,926,945 B2 | 2/2021 | Kennedy et al. | |
| 10,926,995 B2 | 2/2021 | Seay et al. | |
| 10,940,494 B2 | 3/2021 | Romanov et al. | |
| 10,945,554 B2 | 3/2021 | Lo Faro et al. | |
| 10,945,557 B2 | 3/2021 | Nishimura et al. | |
| 10,947,485 B2 | 3/2021 | Min et al. | |
| 10,952,562 B2 | 3/2021 | Tanner et al. | |
| 10,954,043 B2 | 3/2021 | Taruno | |
| 10,961,027 B1 | 3/2021 | Laible | |
| 10,966,563 B2 | 4/2021 | Dubief et al. | |
| 10,966,564 B2 | 4/2021 | Rijskamp et al. | |
| 10,973,364 B2 | 4/2021 | Hesselbrock et al. | |
| 10,981,700 B2 | 4/2021 | Migas et al. | |
| 10,989,026 B2 | 4/2021 | Al-Gouhi et al. | |
| 10,993,575 B2 | 5/2021 | Krug et al. | |
| 10,993,576 B2 | 5/2021 | Fedorak et al. | |
| 10,994,980 B2 | 5/2021 | Jangbarwala et al. | |
| 11,001,490 B2 | 5/2021 | Headley et al. | |
| 11,008,206 B2 | 5/2021 | Pappas | |
| 11,013,363 B1 | 5/2021 | Alsudairi et al. | |
| 11,021,359 B2 | 6/2021 | Bissen et al. | |
| 11,026,539 B2 | 6/2021 | Zosimadis et al. | |
| 11,033,141 B2 | 6/2021 | Schlack | |
| 11,039,712 B2 | 6/2021 | Egli et al. | |
| 11,040,806 B2 | 6/2021 | Naumann et al. | |
| 11,049,354 B2 | 6/2021 | Yoakim | |
| 11,053,053 B2 | 7/2021 | Jordan | |
| 11,059,636 B2 | 7/2021 | Maeda | |
| 11,064,715 B2 | 7/2021 | Herbert et al. | |
| 11,072,521 B2 | 7/2021 | Walker | |
| 11,078,066 B2 | 8/2021 | Crackel et al. | |
| 11,084,007 B2 | 8/2021 | Adams | |
| 11,084,701 B2 | 8/2021 | Kuboi et al. | |
| 11,085,435 B2 | 8/2021 | Dobbins et al. | |
| 11,097,236 B2 | 8/2021 | Alexander et al. | |
| 11,109,708 B2 | 9/2021 | Lecomte et al. | |
| 11,110,418 B2 | 9/2021 | Furman et al. | |
| 11,124,404 B2 | 9/2021 | Von Kraus et al. | |
| 11,129,490 B2 | 9/2021 | Park et al. | |
| 11,129,491 B2 | 9/2021 | Park et al. | |
| 11,147,410 B2 | 10/2021 | Hachenberger et al. | |
| 11,148,927 B2 | 10/2021 | Wing et al. | |
| 11,166,593 B2 | 11/2021 | Trakselis | |
| 11,167,231 B2 | 11/2021 | Akdim et al. | |
| 11,180,293 B2 | 11/2021 | Sahara et al. | |
| 11,191,286 B2 | 12/2021 | Cross et al. | |
| 11,192,711 B2 | 12/2021 | Jarisch et al. | |
| 11,194,443 B2 | 12/2021 | Deo et al. | |
| 11,203,515 B2 | 12/2021 | Cook | |
| 11,206,941 B2 | 12/2021 | Abdo et al. | |
| 11,208,310 B2 | 12/2021 | Tansey, Jr. et al. | |
| 11,208,313 B2 | 12/2021 | Conover et al. | |
| 11,208,314 B2 | 12/2021 | Peirsman et al. | |
| 11,235,267 B1 | 2/2022 | Santoiemmo | |
| 11,242,195 B2 | 2/2022 | Nordqvist et al. | |
| 11,246,326 B2 | 2/2022 | Feola | |
| 11,247,186 B2 | 2/2022 | Topp-Manske | |
| 11,247,892 B2 | 2/2022 | Moore et al. | |
| 11,250,659 B2 | 2/2022 | Tansey, Jr. et al. | |
| 11,252,976 B2 | 2/2022 | Popov et al. | |
| 11,254,491 B2 | 2/2022 | Krüger | |
| 11,254,586 B1 | 2/2022 | Santoiemmo | |
| 11,274,027 B2 | 3/2022 | Krüger et al. | |
| 11,284,734 B2 | 3/2022 | Hilckmann et al. | |
| 11,284,736 B2 | 3/2022 | Ochoa et al. | |
| 11,292,642 B2 | 4/2022 | Hiltser et al. | |
| 11,292,646 B2 | 4/2022 | Bai et al. | |
| 11,292,706 B2 | 4/2022 | Showalter | |
| 11,292,707 B2 | 4/2022 | Lecomte et al. | |
| 11,297,850 B2 | 4/2022 | Popov et al. | |
| 11,304,557 B2 | 4/2022 | De Vreede et al. | |
| 11,312,604 B2 | 4/2022 | Mehta et al. | |
| 11,325,760 B2 | 5/2022 | Alderson et al. | |
| 11,325,818 B2 | 5/2022 | Dahlberg et al. | |
| 11,337,542 B2 | 5/2022 | Kroos | |
| 11,339,045 B2 | 5/2022 | Conway et al. | |
| 11,344,151 B2 | 5/2022 | Rolla | |
| 11,345,581 B2 | 5/2022 | Cook | |
| 11,345,583 B2 | 5/2022 | Aslam et al. | |
| 11,370,648 B2 | 6/2022 | Melville, Jr. et al. | |

(56) References Cited

U.S. PATENT DOCUMENTS

| | | | |
|---|---|---|---|
| 11,407,629 B1 | 8/2022 | Siegel | |
| 11,407,630 B1 | 8/2022 | Shafir | |
| 11,465,892 B1 | 10/2022 | Dos Santos | |
| 11,470,994 B2 | 10/2022 | Hashimoto | |
| 11,479,457 B2 | 10/2022 | Krüger et al. | |
| 11,498,824 B2 | 11/2022 | Zemko | |
| 11,634,314 B1 | 4/2023 | Anthony et al. | |
| 11,647,860 B1 | 5/2023 | Anthony et al. | |
| 11,745,996 B1 | 9/2023 | Zbedlick | |
| 12,017,192 B1 | 6/2024 | Chen et al. | |
| 2002/0059870 A1 | 5/2002 | Walters, Jr. et al. | |
| 2002/0121531 A1 | 9/2002 | Stillinger et al. | |
| 2002/0130140 A1 | 9/2002 | Cote | |
| 2002/0158075 A1 | 10/2002 | Caldicott et al. | |
| 2003/0012849 A1 | 1/2003 | Berson | |
| 2003/0102330 A1 | 6/2003 | Cote | |
| 2003/0132241 A1 | 7/2003 | Treat | |
| 2003/0168455 A1 | 9/2003 | Zettle et al. | |
| 2004/0195245 A1 | 10/2004 | Gohil | |
| 2005/0000053 A1 | 1/2005 | Kasper et al. | |
| 2005/0040131 A1 | 2/2005 | Lin | |
| 2005/0092392 A1 | 5/2005 | Abe | |
| 2005/0095158 A1 | 5/2005 | Kirschner et al. | |
| 2005/0151764 A1 | 7/2005 | Grady et al. | |
| 2005/0184075 A1 | 8/2005 | Belcastro | |
| 2005/0191759 A1 | 9/2005 | Pedersen-Bjergaard et al. | |
| 2005/0241489 A1 | 11/2005 | Kirschner et al. | |
| 2006/0071040 A1 | 4/2006 | Young | |
| 2006/0124659 A1 | 6/2006 | Mosconi et al. | |
| 2006/0124662 A1 | 6/2006 | Reynolds et al. | |
| 2006/0196364 A1 | 9/2006 | Kirschner | |
| 2006/0196892 A1 | 9/2006 | Crisp et al. | |
| 2006/0226176 A1 | 10/2006 | Tseng | |
| 2008/0078769 A1 | 4/2008 | Crunkleton et al. | |
| 2008/0237271 A1 | 10/2008 | Olechowski | |
| 2008/0272144 A1 | 11/2008 | Bonney et al. | |
| 2008/0287880 A1 | 11/2008 | Keller | |
| 2009/0120958 A1 | 5/2009 | Landers et al. | |
| 2009/0140006 A1 | 6/2009 | Vitantonio et al. | |
| 2009/0214742 A1 | 8/2009 | Peden et al. | |
| 2009/0236361 A1 | 9/2009 | Doelman et al. | |
| 2010/0089921 A1 | 4/2010 | Ellenkamp-Van et al. | |
| 2010/0170841 A1 | 7/2010 | An et al. | |
| 2010/0192782 A1 | 8/2010 | Blumenauer et al. | |
| 2010/0251901 A1 | 10/2010 | Santoiemmo | |
| 2011/0011889 A1 | 1/2011 | Bonney et al. | |
| 2011/0107545 A1 | 5/2011 | Cagnina et al. | |
| 2011/0181417 A1 | 7/2011 | Haskayne et al. | |
| 2011/0186535 A1 | 8/2011 | Meager | |
| 2011/0290828 A1 | 12/2011 | Lolk | |
| 2012/0187153 A1 | 7/2012 | Burge et al. | |
| 2012/0193318 A1 | 8/2012 | Meager | |
| 2013/0062366 A1 | 3/2013 | Tansey | |
| 2013/0098499 A1 | 4/2013 | Bencista et al. | |
| 2013/0139702 A1* | 6/2013 | Fin | A47J 31/462 |
| | | | 99/300 |
| 2013/0233878 A1 | 9/2013 | Lindmayer | |
| 2014/0004241 A1 | 1/2014 | Hatherell | |
| 2014/0070431 A1 | 3/2014 | Hatherell | |
| 2014/0154368 A1 | 6/2014 | Kolls et al. | |
| 2014/0175125 A1 | 6/2014 | Breault | |
| 2014/0182715 A1 | 7/2014 | Cooper et al. | |
| 2014/0231442 A1 | 8/2014 | Hill et al. | |
| 2014/0263415 A1 | 9/2014 | San Miguel et al. | |
| 2014/0272019 A1 | 9/2014 | Schuh et al. | |
| 2014/0331868 A1 | 11/2014 | Novak et al. | |
| 2015/0050392 A1 | 2/2015 | Stonehouse et al. | |
| 2015/0125578 A1 | 5/2015 | Hatherell | |
| 2015/0125586 A1 | 5/2015 | Ergican | |
| 2015/0166252 A1 | 6/2015 | Jones | |
| 2015/0210522 A1 | 7/2015 | Jersey et al. | |
| 2015/0225169 A1 | 8/2015 | Jarisch | |
| 2015/0374025 A1 | 12/2015 | Evans et al. | |
| 2016/0009539 A1 | 1/2016 | Jersey et al. | |
| 2016/0130076 A1 | 5/2016 | Jarisch | |
| 2016/0192806 A1 | 7/2016 | Pikkemaat et al. | |
| 2016/0242456 A1 | 8/2016 | Evans et al. | |
| 2016/0251208 A1 | 9/2016 | Tansey, Jr. | |
| 2016/0255991 A1 | 9/2016 | Givens, Jr. et al. | |
| 2016/0318689 A1 | 11/2016 | Rudick et al. | |
| 2016/0332124 A1 | 11/2016 | Cohen | |
| 2017/0215645 A1 | 8/2017 | Doglioni Majer et al. | |
| 2017/0225880 A1 | 8/2017 | Vivier et al. | |
| 2017/0280750 A1 | 10/2017 | Arnaud et al. | |
| 2017/0332672 A1 | 11/2017 | Kasprzycki et al. | |
| 2017/0334636 A1 | 11/2017 | Park et al. | |
| 2017/0341856 A1 | 11/2017 | Aschwanden | |
| 2017/0370629 A1 | 12/2017 | Fire | |
| 2018/0000280 A1 | 1/2018 | Dubief | |
| 2018/0057337 A1 | 3/2018 | Babucke et al. | |
| 2018/0086621 A1 | 3/2018 | Dubief et al. | |
| 2018/0093820 A1 | 4/2018 | Massey et al. | |
| 2018/0215603 A1 | 8/2018 | Hecht | |
| 2018/0251358 A1 | 9/2018 | Wing et al. | |
| 2018/0251361 A1 | 9/2018 | Wing et al. | |
| 2018/0297830 A1 | 10/2018 | Kraenzle | |
| 2018/0312386 A1 | 11/2018 | Brun-Kestler et al. | |
| 2018/0354713 A1 | 12/2018 | Ting et al. | |
| 2019/0053658 A1* | 2/2019 | Lecomte | A47J 31/407 |
| 2019/0077586 A1 | 3/2019 | Cafaro et al. | |
| 2019/0134583 A1 | 5/2019 | Lautenschläger et al. | |
| 2019/0144804 A1 | 5/2019 | Hong et al. | |
| 2019/0146641 A1 | 5/2019 | Deo et al. | |
| 2019/0153368 A1 | 5/2019 | Yoon et al. | |
| 2019/0166886 A1 | 6/2019 | Gordon et al. | |
| 2019/0169016 A1 | 6/2019 | Vandekerckhove et al. | |
| 2019/0191916 A1 | 6/2019 | Guyon et al. | |
| 2019/0231119 A1 | 8/2019 | Kennedy et al. | |
| 2019/0241420 A1 | 8/2019 | Peirsman et al. | |
| 2019/0269156 A1 | 9/2019 | Van De Sluis et al. | |
| 2019/0270630 A1 | 9/2019 | Dahan et al. | |
| 2019/0274469 A1 | 9/2019 | Van De Sluis | |
| 2019/0274482 A1 | 9/2019 | Abdo et al. | |
| 2019/0275478 A1 | 9/2019 | Jersey et al. | |
| 2019/0276297 A1 | 9/2019 | Tewari | |
| 2019/0290054 A1 | 9/2019 | Weber et al. | |
| 2019/0291062 A1 | 9/2019 | Wood et al. | |
| 2019/0291064 A1 | 9/2019 | Conroy et al. | |
| 2019/0292034 A1 | 9/2019 | Wood et al. | |
| 2019/0292036 A1 | 9/2019 | Rice et al. | |
| 2019/0328170 A1 | 10/2019 | Cai | |
| 2019/0335952 A1 | 11/2019 | Di Bari | |
| 2019/0337713 A1 | 11/2019 | Ergican et al. | |
| 2019/0344233 A1 | 11/2019 | Savino | |
| 2019/0367350 A1 | 12/2019 | Bhutani et al. | |
| 2020/0000272 A1 | 1/2020 | Nabeiro et al. | |
| 2020/0010311 A1 | 1/2020 | Moore | |
| 2020/0017806 A1 | 1/2020 | Peirsman et al. | |
| 2020/0031651 A1 | 1/2020 | Schneidewend et al. | |
| 2020/0047137 A1 | 2/2020 | Wilder et al. | |
| 2020/0054172 A1 | 2/2020 | Trakselis | |
| 2020/0060465 A1 | 2/2020 | Longman et al. | |
| 2020/0062476 A1 | 2/2020 | Katayama et al. | |
| 2020/0077841 A1 | 3/2020 | Dercar et al. | |
| 2020/0079637 A1 | 3/2020 | Kaplita et al. | |
| 2020/0100618 A1 | 4/2020 | Guyon et al. | |
| 2020/0107671 A1 | 4/2020 | Gordon et al. | |
| 2020/0121115 A1 | 4/2020 | Oh | |
| 2020/0122100 A1 | 4/2020 | Tumey | |
| 2020/0122994 A1 | 4/2020 | Cimatti et al. | |
| 2020/0146308 A1 | 5/2020 | Roberts et al. | |
| 2020/0146500 A1 | 5/2020 | Cafaro et al. | |
| 2020/0146501 A1 | 5/2020 | Mchugh et al. | |
| 2020/0156019 A1 | 5/2020 | Sawyer et al. | |
| 2020/0170443 A1 | 6/2020 | Chioda et al. | |
| 2020/0187718 A1 | 6/2020 | Seidl | |
| 2020/0198956 A1 | 6/2020 | Hartsfield et al. | |
| 2020/0207603 A1 | 7/2020 | Sevcik | |
| 2020/0216786 A1 | 7/2020 | Pintz | |
| 2020/0229472 A1 | 7/2020 | Manne | |
| 2020/0231372 A1 | 7/2020 | Parise | |
| 2020/0253361 A1 | 8/2020 | Davidson | |
| 2020/0281396 A1 | 9/2020 | Accursi et al. | |
| 2020/0331739 A1 | 10/2020 | Mehta et al. | |

(56) References Cited

U.S. PATENT DOCUMENTS

| | | |
|---|---|---|
| 2020/0345170 A1 | 11/2020 | Jarisch et al. |
| 2020/0359822 A1 | 11/2020 | Dercar et al. |
| 2020/0359841 A1 | 11/2020 | Dercar et al. |
| 2020/0360875 A1 | 11/2020 | Danieli et al. |
| 2020/0361758 A1 | 11/2020 | Fantappié al. |
| 2020/0367689 A1 | 11/2020 | Illy et al. |
| 2020/0369440 A1 | 11/2020 | Croibier et al. |
| 2020/0369446 A1 | 11/2020 | Mélan-Moutet |
| 2020/0369504 A1 | 11/2020 | Balstad et al. |
| 2020/0369505 A1 | 11/2020 | Mckay |
| 2020/0375221 A1 | 12/2020 | Colvin et al. |
| 2020/0397184 A1 | 12/2020 | Ruggiero et al. |
| 2021/0000289 A1 | 1/2021 | Krüger et al. |
| 2021/0002044 A1 | 1/2021 | Koenigseder |
| 2021/0002046 A1 | 1/2021 | Da Costa et al. |
| 2021/0013785 A1 | 1/2021 | Liang et al. |
| 2021/0015303 A1 | 1/2021 | Byun et al. |
| 2021/0052104 A1 | 2/2021 | Perentes |
| 2021/0100394 A1 | 4/2021 | Affolter et al. |
| 2021/0101722 A1 | 4/2021 | Migas et al. |
| 2021/0106163 A1 | 4/2021 | Van De Sluis et al. |
| 2021/0122540 A1 | 4/2021 | Meager |
| 2021/0127891 A1 | 5/2021 | Wei |
| 2021/0127902 A1 | 5/2021 | Deng et al. |
| 2021/0137304 A1 | 5/2021 | Krger et al. |
| 2021/0137315 A1 | 5/2021 | Byun et al. |
| 2021/0147138 A1 | 5/2021 | Affolter et al. |
| 2021/0171333 A1 | 6/2021 | Amos |
| 2021/0177189 A1 | 6/2021 | Kordich et al. |
| 2021/0179411 A1 | 6/2021 | Dahan et al. |
| 2021/0188530 A1 | 6/2021 | Pellegrini et al. |
| 2021/0196074 A1 | 7/2021 | Guarin et al. |
| 2021/0259286 A1 | 8/2021 | Siegel et al. |
| 2021/0259472 A1 | 8/2021 | Seidler et al. |
| 2021/0261324 A1 | 8/2021 | Arnold |
| 2021/0275942 A1 | 9/2021 | Stryker et al. |
| 2021/0292152 A1 | 9/2021 | Fedorka et al. |
| 2021/0307564 A1 | 10/2021 | Gort-Barten |
| 2021/0309422 A1 | 10/2021 | Hiltser et al. |
| 2021/0316913 A1 | 10/2021 | Woody et al. |
| 2021/0316979 A1 | 10/2021 | Hayes-Pankhurst et al. |
| 2021/0317393 A1 | 10/2021 | Peirsman et al. |
| 2021/0338004 A1 | 11/2021 | Alsayar et al. |
| 2021/0347623 A1 | 11/2021 | Fantappie et al. |
| 2021/0354883 A1 | 11/2021 | Ferrari et al. |
| 2021/0361112 A1 | 11/2021 | Hobden et al. |
| 2021/0362993 A1 | 11/2021 | Shafir et al. |
| 2021/0378267 A1 | 12/2021 | Barak |
| 2021/0380392 A1 | 12/2021 | Glucksman et al. |
| 2022/0002134 A1 | 1/2022 | Pellaud |
| 2022/0022496 A1 | 1/2022 | Monsanto et al. |
| 2022/0024748 A1 | 1/2022 | Fantappie et al. |
| 2022/0031110 A1 | 2/2022 | Sekulic et al. |
| 2022/0031113 A1 | 2/2022 | Smith et al. |
| 2022/0033172 A1 | 2/2022 | Favre |
| 2022/0039587 A1 | 2/2022 | De Freitas |
| 2022/0039602 A1 | 2/2022 | Xiong |
| 2022/0040651 A1 | 2/2022 | Böttcher et al. |
| 2022/0053967 A1 | 2/2022 | Guyon et al. |
| 2022/0061581 A1 | 3/2022 | Fernandes De Carvalho et al. |
| 2022/0071435 A1 | 3/2022 | Tseng |
| 2022/0071437 A1 | 3/2022 | Tseng |
| 2022/0071440 A1 | 3/2022 | Tseng et al. |
| 2022/0071441 A1 | 3/2022 | Patil et al. |
| 2022/0073238 A1 | 3/2022 | Naumann et al. |
| 2022/0073336 A1 | 3/2022 | Savioz |
| 2022/0088937 A1 | 3/2022 | Oya |
| 2022/0098020 A1 | 3/2022 | Garcia Tebar |
| 2022/0106180 A1 | 4/2022 | Rue et al. |
| 2022/0135294 A1 | 5/2022 | Peng et al. |
| 2022/0169424 A1 | 6/2022 | Yang |
| 2022/0289548 A1 | 9/2022 | Augsburger |
| 2022/0296015 A1 | 9/2022 | Crane |

FOREIGN PATENT DOCUMENTS

| | | |
|---|---|---|
| AU | 2013284311 B2 | 12/2016 |
| AU | 2014241782 B2 | 9/2017 |
| AU | 2016259900 A1 | 11/2017 |
| AU | 2016200626 B2 | 3/2018 |
| AU | 2018201199 B2 | 11/2018 |
| AU | 2017394249 A1 | 7/2019 |
| AU | 2019238313 A1 | 11/2020 |
| BR | 112014032633 B1 | 4/2020 |
| BR | 112021003593 A2 | 5/2021 |
| CA | 3081923 A1 | 2/2013 |
| CA | 2903862 A1 | 9/2014 |
| CA | 2904325 A1 | 9/2014 |
| CA | 2920909 A1 | 2/2015 |
| CA | 2961901 A1 | 4/2016 |
| CA | 2967927 A1 | 5/2016 |
| CA | 2977475 A1 | 9/2016 |
| CA | 2983958 A1 | 11/2016 |
| CA | 2996900 A1 | 3/2017 |
| CA | 2781759 C | 9/2017 |
| CA | 2837286 C | 11/2017 |
| CA | 2837064 C | 1/2018 |
| CA | 3041722 A1 | 5/2018 |
| CA | 3047084 A1 | 6/2018 |
| CA | 3049841 A1 | 7/2018 |
| CA | 3079433 A1 | 4/2019 |
| CA | 3095669 A1 | 9/2019 |
| CA | 2936866 C | 10/2019 |
| CA | 2875899 C | 12/2019 |
| CA | 2843702 C | 7/2020 |
| CA | 3081920 C | 9/2021 |
| CN | 1016312 B | 4/1992 |
| CN | 201200323 Y | 3/2009 |
| CN | 101432221 B | 8/2012 |
| CN | 101300190 B | 2/2013 |
| CN | 103213928 A | 7/2013 |
| CN | 203314745 U | 12/2013 |
| CN | 203576299 U | 5/2014 |
| CN | 102842181 B | 1/2015 |
| CN | 104654699 A | 5/2015 |
| CN | 104828373 A | 8/2015 |
| CN | 105000258 A | 10/2015 |
| CN | 103720363 B | 11/2015 |
| CN | 105377408 A | 3/2016 |
| CN | 103648963 B | 4/2016 |
| CN | 103213928 B | 5/2016 |
| CN | 105595868 A | 5/2016 |
| CN | 103687800 B | 8/2016 |
| CN | 103781538 B | 9/2016 |
| CN | 103663329 B | 4/2017 |
| CN | 103430117 B | 5/2017 |
| CN | 105307973 B | 9/2017 |
| CN | 103841862 B | 10/2017 |
| CN | 102712453 B | 11/2017 |
| CN | 105188897 B | 11/2017 |
| CN | 107530653 A | 1/2018 |
| CN | 108024654 A | 5/2018 |
| CN | 105712278 B | 8/2018 |
| CN | 208291834 U | 12/2018 |
| CN | 109171502 A | 1/2019 |
| CN | 109380973 A | 2/2019 |
| CN | 109922668 A | 6/2019 |
| CN | 104582509 B | 7/2019 |
| CN | 106715322 B | 8/2019 |
| CN | 105849030 B | 9/2019 |
| CN | 110198910 A | 9/2019 |
| CN | 110234592 A | 9/2019 |
| CN | 110247484 A | 9/2019 |
| CN | 106073500 B | 10/2019 |
| CN | 107108192 B | 10/2019 |
| CN | 107074522 B | 1/2020 |
| CN | 209988362 U | 1/2020 |
| CN | 107108191 B | 2/2020 |
| CN | 107438580 B | 3/2020 |
| CN | 105011305 B | 5/2020 |
| CN | 111356648 A | 6/2020 |
| CN | 108910815 B | 7/2020 |
| CN | 111386060 A | 7/2020 |

(56)  References Cited

FOREIGN PATENT DOCUMENTS

| | | | |
|---|---|---|---|
| CN | 111466793 | A | 7/2020 |
| CN | 106793808 | B | 8/2020 |
| CN | 111589315 | A | 8/2020 |
| CN | 112218819 | A | 1/2021 |
| CN | 112421819 | A | 2/2021 |
| CN | 112998522 | A | 6/2021 |
| CN | 113038840 | A | 6/2021 |
| CN | 107205445 | B | 7/2021 |
| CN | 113165861 | A | 7/2021 |
| CN | 113226052 | A | 8/2021 |
| CN | 108768070 | B | 9/2021 |
| CN | 214731066 | U | 11/2021 |
| CN | 110980621 | B | 1/2022 |
| CN | 113905975 | A | 1/2022 |
| CN | 109863112 | B | 2/2022 |
| CN | 113995076 | A | 2/2022 |
| CN | 112313168 | B | 10/2022 |
| DE | 202015104155 | U1 | 11/2015 |
| EP | 268451 | A2 | 5/1988 |
| EP | 1351758 | A1 | 10/2003 |
| EP | 1767262 | B1 | 8/2008 |
| EP | 1718403 | B1 | 5/2011 |
| EP | 2340754 | A1 | 7/2011 |
| EP | 2359260 | A1 | 8/2011 |
| EP | 2340754 | B1 | 10/2012 |
| EP | 2504270 | A1 | 10/2012 |
| EP | 2504271 | A1 | 10/2012 |
| EP | 1966065 | B2 | 11/2012 |
| EP | 2714577 | A1 | 4/2014 |
| EP | 2737834 | A1 | 6/2014 |
| EP | 2969899 | A2 | 1/2016 |
| EP | 2714577 | B1 | 7/2016 |
| EP | 2719450 | B1 | 7/2016 |
| EP | 2504270 | B1 | 11/2016 |
| EP | 3003542 | A4 | 1/2017 |
| EP | 3021686 | A4 | 2/2017 |
| EP | 2359260 | B1 | 6/2017 |
| EP | 3197820 | A2 | 8/2017 |
| EP | 2976975 | B1 | 1/2018 |
| EP | 3261981 | A1 | 1/2018 |
| EP | 3212562 | A4 | 6/2018 |
| EP | 2741845 | B1 | 8/2018 |
| EP | 3294443 | A4 | 1/2019 |
| EP | 3040114 | B1 | 3/2019 |
| EP | 3275345 | B1 | 3/2019 |
| EP | 3349622 | A4 | 6/2019 |
| EP | 3221251 | B1 | 10/2019 |
| EP | 3533937 | A3 | 11/2019 |
| EP | 3452403 | A4 | 1/2020 |
| EP | 2504271 | B1 | 4/2020 |
| EP | 3537891 | A4 | 5/2020 |
| EP | 3554988 | A4 | 7/2020 |
| EP | 2866593 | B1 | 8/2020 |
| EP | 3643676 | A3 | 8/2020 |
| EP | 3697724 | A1 | 8/2020 |
| EP | 2714578 | B1 | 12/2020 |
| EP | 3760795 | A1 | 1/2021 |
| EP | 3762331 | A1 | 1/2021 |
| EP | 3200610 | B1 | 2/2021 |
| EP | 3571152 | A4 | 3/2021 |
| EP | 3834622 | A1 | 6/2021 |
| EP | 3212563 | B1 | 9/2021 |
| EP | 3869973 | A1 | 9/2021 |
| EP | 3870535 | A1 | 9/2021 |
| EP | 3871994 | A1 | 9/2021 |
| EP | 3877322 | A1 | 9/2021 |
| EP | 3883389 | A1 | 9/2021 |
| EP | 3768629 | A4 | 12/2021 |
| EP | 3808230 | B1 | 6/2022 |
| EP | 4069626 | A1 | 10/2022 |
| ES | 2351796 | T3 | 2/2011 |
| ES | 2532901 | T3 | 4/2015 |
| ES | 2749388 | T3 | 3/2020 |
| FR | 2623488 | A1 | 5/1989 |
| FR | 3041614 | A1 | 3/2017 |
| FR | 3078531 | B1 | 5/2021 |
| GB | 2259653 | A | 3/1993 |
| GB | 2486872 | A | 7/2012 |
| GB | 2526734 | A | 12/2015 |
| GB | 2486872 | B | 3/2016 |
| IL | 119044 | | 11/1996 |
| RU | 2491875 | C2 | 9/2013 |
| WO | 8503853 | A1 | 9/1985 |
| WO | 8907575 | A1 | 8/1989 |
| WO | 9807122 | A1 | 2/1998 |
| WO | 103817 | A1 | 1/2001 |
| WO | 3083431 | A2 | 10/2003 |
| WO | 3098776 | A1 | 11/2003 |
| WO | 2004063087 | A1 | 7/2004 |
| WO | 2008101275 | A1 | 8/2008 |
| WO | 2009027053 | A1 | 3/2009 |
| WO | 2009135758 | A1 | 11/2009 |
| WO | 2009136781 | A1 | 11/2009 |
| WO | 2012025425 | A1 | 3/2012 |
| WO | 2012082712 | A1 | 6/2012 |
| WO | 2013019963 | A2 | 2/2013 |
| WO | 2013036564 | A2 | 3/2013 |
| WO | 2013019963 | A3 | 5/2013 |
| WO | 2014037456 | A1 | 3/2014 |
| WO | 2014182423 | A2 | 11/2014 |
| WO | 2014182423 | A3 | 12/2014 |
| WO | 2014201753 | A1 | 12/2014 |
| WO | 2016073069 | A1 | 5/2016 |
| WO | 2016087474 | A1 | 6/2016 |
| WO | 2016202815 | A1 | 12/2016 |
| WO | 2017096505 | A1 | 6/2017 |
| WO | 2017109718 | A1 | 6/2017 |
| WO | 2018210558 | A1 | 11/2018 |
| WO | 2019170548 | A1 | 9/2019 |
| WO | 2019183540 | A1 | 9/2019 |
| WO | 2020084615 | A1 | 4/2020 |
| WO | 2020086425 | A1 | 4/2020 |
| WO | 2020092859 | A1 | 5/2020 |
| WO | 2020097558 | A1 | 5/2020 |
| WO | 2020097728 | A1 | 5/2020 |
| WO | 2020092859 | A8 | 6/2020 |
| WO | 2020148294 | A1 | 7/2020 |
| WO | 2020148293 | A3 | 9/2020 |
| WO | 2020174336 | A1 | 9/2020 |
| WO | 2020193376 | A1 | 10/2020 |
| WO | 2020198811 | A1 | 10/2020 |
| WO | 2020219385 | A1 | 10/2020 |
| WO | 2020234060 | A1 | 11/2020 |
| WO | 2020243452 | A1 | 12/2020 |
| WO | 2021016331 | A1 | 1/2021 |
| WO | 2021016343 | A1 | 1/2021 |
| WO | 2021018760 | A1 | 2/2021 |
| WO | 2021019161 | A1 | 2/2021 |
| WO | 2021028654 | A2 | 2/2021 |
| WO | 2021032892 | A1 | 2/2021 |
| WO | 2021055937 | A1 | 3/2021 |
| WO | 2021061553 | A1 | 4/2021 |
| WO | 2021061614 | A1 | 4/2021 |
| WO | 2021090186 | A1 | 5/2021 |
| WO | 2021093936 | A1 | 5/2021 |
| WO | 2021101990 | A1 | 5/2021 |
| WO | 2021115135 | A1 | 6/2021 |
| WO | 2021138385 | A1 | 7/2021 |
| WO | 2021140254 | A1 | 7/2021 |
| WO | 2021168069 | A1 | 8/2021 |
| WO | 2021174309 | A1 | 9/2021 |
| WO | 2021191774 | A1 | 9/2021 |
| WO | 2021198162 | A1 | 10/2021 |
| WO | 2021209507 | A1 | 10/2021 |
| WO | 2021228877 | A1 | 11/2021 |
| WO | 2021233931 | A1 | 11/2021 |
| WO | 2021240307 | A1 | 12/2021 |
| WO | 2021240308 | A1 | 12/2021 |
| WO | 2021240311 | A1 | 12/2021 |
| WO | 2022020764 | A1 | 1/2022 |
| WO | 2022038408 | A1 | 2/2022 |
| WO | 2022051389 | A1 | 3/2022 |

(56)          References Cited

FOREIGN PATENT DOCUMENTS

| | | | |
|---|---|---|---|
| WO | 2022126811 | A1 | 6/2022 |
| WO | 2022189622 | A1 | 9/2022 |
| WO | 2022189623 | A1 | 9/2022 |

OTHER PUBLICATIONS

Invitation to Pay Additional Fees received for PCT Application No. PCT/US2023/078826, mailed on Mar. 12, 2024, 10 pages.

U.S. Appl. No. 18/124,715, filed Mar. 22, 2023, Additive Container With Inlet Tube.

U.S. Appl. No. 18/124,905, filed Mar. 22, 2023, Additive Container With Bottom Cover.

U.S. Appl. No. 18/124,765, filed Mar. 22, 2023, Adapter for Beverage Dispenser.

U.S. Appl. No. 18/208,863, filed Jun. 12, 2023, Adapter for Beverage Dispenser.

U.S. Appl. No. 17/989,640 entitled "Carbonation System Ingredient Container" filed Nov. 17, 2022, 63 pages.

International Search Report and Written Opinion received for PCT Application No. PCT/US2023/078826, mailed on Jul. 4, 2024, 23 pages.

Invitation to Pay Additional Fees received for PCT Application No. PCT/US2024/016898, mailed on Jul. 1, 2024, 11 pages.

International Search Report and Written Opinion received for PCT Patent Application No. PCT/US2024/016898, mailed on Oct. 11, 2024, 19 pages.

* cited by examiner

10

300

331    324    324A     331

330

328

326

328

326A

320

350

310

ADDITIVE CONTAINER WITH BOTTOM COVER

CROSS REFERENCE TO RELATED APPLICATION

This application is a continuation of U.S. application Ser. No. 18/124,905, filed on Mar. 22, 2023 and entitled "ADDITIVE CONTAINER WITH BOTTOM COVER," which is hereby incorporated herein by reference in its entirety.

FIELD

Additive containers for use with beverage dispensing devices are provided.

BACKGROUND

Conventional beverage dispensing devices operate to carbonate and/or flavor water. Some devices may mix carbonated water and a flavoring compound together in a machine and then dispense the resulting mixture into a receptacle. Unless the devices are thoroughly cleaned, this method can result in contamination occurring over time. Other devices rely on crushing, puncturing, and/or generally compromising flavoring containers in order to access the flavoring compounds inside. These methods of breaching flavoring containers can result in splatter and mess, which, if not thoroughly cleaned, can result in similar contamination.

Still other devices rely on carbonating water within a specialized container to be attached to the device, and from which the resulting beverage is served. The container can be pre-filled with water and/or flavoring, and then it can be secured to the devices and pressurized within the container and used to serve the resulting beverage. These devices, however, can create excess plastic waste, as specially adapted bottles must be produced to interface with the device.

Accordingly, there remains a need for improved methods and devices for preparing a beverage containing an additive.

SUMMARY

Additive containers for use with beverage dispensing systems are provided. Related apparatuses and methods are also provided.

In an embodiment, an additive container is provided. The additive container can include a housing defining a hollow interior configured to retain a fluid therein, and an elongate tube disposed within the housing. The housing can have an inlet leading to the hollow interior and an outlet leading to the hollow interior. The inlet and the outlet can be spaced apart from one another. The additive container can also include an elongate tube disposed within the housing and having a first end fluidly coupled to the inlet and a second end defining an opening. The second end can be positioned at an opposite end of the housing from the first end, and the second end can be configured to extend above a level of fluid in the housing to allow gas to flow through the tube and into the housing. The additive container can further include a valve disposed in the outlet and movable between a closed configuration in which fluid is prevented from flowing therethrough, and an open configuration in which fluid within the hollow interior can flow therethrough. The valve can be configured to move from the closed position to the open position in response to a pressure increase in the hollow interior resulting from delivery of gas into the hollow interior through the tube.

The additive container can vary in a number of ways. For example, the inlet can include a collar extending therearound and projecting from the housing. For example, the inlet and outlet can be positioned in a first end of the housing. The second end of the tube can be positioned adjacent a second end of the housing opposite the first end. For example, the second end of the tube can be configured to be positioned above a level of fluid in the housing is oriented such that the inlet and outlet are positioned below the tube. For example, the housing can include a body defining the hollow interior and a cap disposed over an opening in the body leading to the hollow interior. In some aspects, inlet and outlet can be in the cap. For example, the inlet and the outlet each can have a central longitudinal axis extending substantially parallel to one another.

In another embodiment, an additive container is provided. The additive container can include a housing defining a hollow interior, an inlet positioned in the bottom of the housing, and an outlet positioned in the bottom of the housing. The housing can have a top, a bottom, and at least one sidewall extending between the top and bottom. The inlet can have a tube extending therefrom into the hollow interior toward the top of the housing. The tube can have an open end adjacent the top of the housing, and the tube can be configured to allow a gas to be passed into the inlet and through the tube for delivery into the hollow interior. The outlet can have a valve disposed therein. The valve can be configured to move from a closed position to an open position in response to a pressure increase in the hollow interior.

The additive container can vary in a number of ways. For example, the housing can include a body and a cap coupled to the body. The cap can have the inlet and outlet therein. In some aspects, the body can be rigid and non-deformable. For example, inlet can include a collar disposed therearound and projecting from the housing. For example, the outer valve can include a slit valve. For example, the inlet and outlet can be spaced a distance apart.

In another embodiment, an additive container is provided. The additive container can include a housing defining a hollow interior and having an opening at a first end leading to the hollow interior, a cover disposed over the opening, an inlet formed in a wall of the housing and leading to the hollow interior, and an outlet formed in the wall of the housing and spaced apart from the inlet. The inlet can have an inlet valve movable between open and closed positions for allowing fluid flow into the hollow interior. The outlet can have an outlet valve movable between open and closed positions for allowing fluid flow out of the hollow interior.

The additive container can vary in a number of ways. For example, the cover can define a first end of the housing and the inlet and outlet are formed in a second end of the housing opposite the first end. For example, the cover can be pivotally coupled to the housing. For example, the cover can be removably coupled to the housing. For example, the cover can prevent fluid flow into and out of the hollow interior through the opening when the cover is disposed over the opening.

In another embodiment, an additive container is provided. The additive container can include a housing defining a hollow interior and including an opening at a first end leading to the hollow interior, and a cap coupled to the housing and configured to close off the opening. The housing can include an inlet and an outlet formed in wall of the housing at a second end opposite the first end. The inlet and outlet can be in fluid communication with the hollow interior and at least one of the inlet and outlet including a valve therein.

The additive container can vary in a number of ways. For example, the inlet can include an inlet valve and the outlet includes an outlet valve, the inlet valve and the outlet valve being respectively movable between open and closed positions to allow fluid flow therethrough. For example, the cap can be removably coupled to the housing. For example, the housing can have a substantially ovular cross-section with major and minor axes, and wherein the inlet and the outlet are aligned along the minor axis. For example, the cap can be configured to couple to the housing via a snap-fit. For example, the cap can be configured to seal the hollow interior when coupled to the housing. For example, the cap can be pivotally coupled to the housing.

In another embodiment, an adapter is provided. The adapter can include an adapter base having upper and lower surfaces with first and second fluid ports therein, a first connector positioned in the first port on the upper surface and having a first valve therein, a second connector positioned in the second port on the upper surface and having a second valve therein, and at least one anchor extending from the lower surface of the adapter base and configured to secure the adapter base to a beverage dispenser. The first valve can be configured to allow a first fluid to flow therethrough in a first direction, and the second valve can be configured to allow a second fluid to flow therethrough in a second direction that is opposite the first direction.

The adapter can vary in a number of ways. For example, the adapter can further include a first tubing coupled to the first port, and a second tubing coupled to the second port. In some variations, the adapter can further include a housing coupled to the first tubing and the second tubing. The housing can be configured to receive the first fluid from the first tubing and configured to dispense the second fluid to the second tubing. For example, the first and second connectors can each include a hollow tube having a flared portion at a terminal end thereof. For example, the first and second ports can define a substantially figure-8 shaped contour around a perimeter thereof. For example, the adapter base can be substantially triangular. For example, the first fluid port can include a first valve movable between open and closed positions to allow the first fluid therethrough, and the second fluid port can include a second valve movable between open and closed positions for allowing the second fluid therethrough.

In another embodiment, a device is provided. The device can include a housing defining a hollow interior, an adapter configured to couple with a beverage dispenser, a first fluid pathway disposed between the housing and the adapter, and a second fluid pathway disposed between the housing and the adapter. The first fluid pathway can be configured to transport at least one gas from the adapter to the housing. The second fluid pathway can be configured to transport an additive from the housing to the adapter in response to the at least one gas being transported from the adapter to the housing.

The device can vary in a number of ways. For example, the first fluid pathway and second fluid pathway can include flexible tubing. For example, the adapter can include an inlet port and an outlet port, and wherein the first fluid pathway is coupled to the inlet port and the second fluid pathway is coupled to the outlet port. In some variations, the inlet port can include an inlet valve movable between open and closed positions, and the outlet port comprises an outlet valve movable between open and closed positions. For example, the adapter can include at least one anchor extending from a first side thereof and configured to secure the adapter to the beverage dispenser, and the first fluid pathway and second fluid pathway can couple to a second side of the adapter opposite the first side. In some variations, the at least one anchor can include a first anchor disposed on a first end of the adapter and a second anchor disposed on a second end of the adapter. For example, the adapter can be substantially triangular.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other features will be more readily understood from the following detailed description taken in conjunction with the accompanying drawings, in which.

Figure 1:
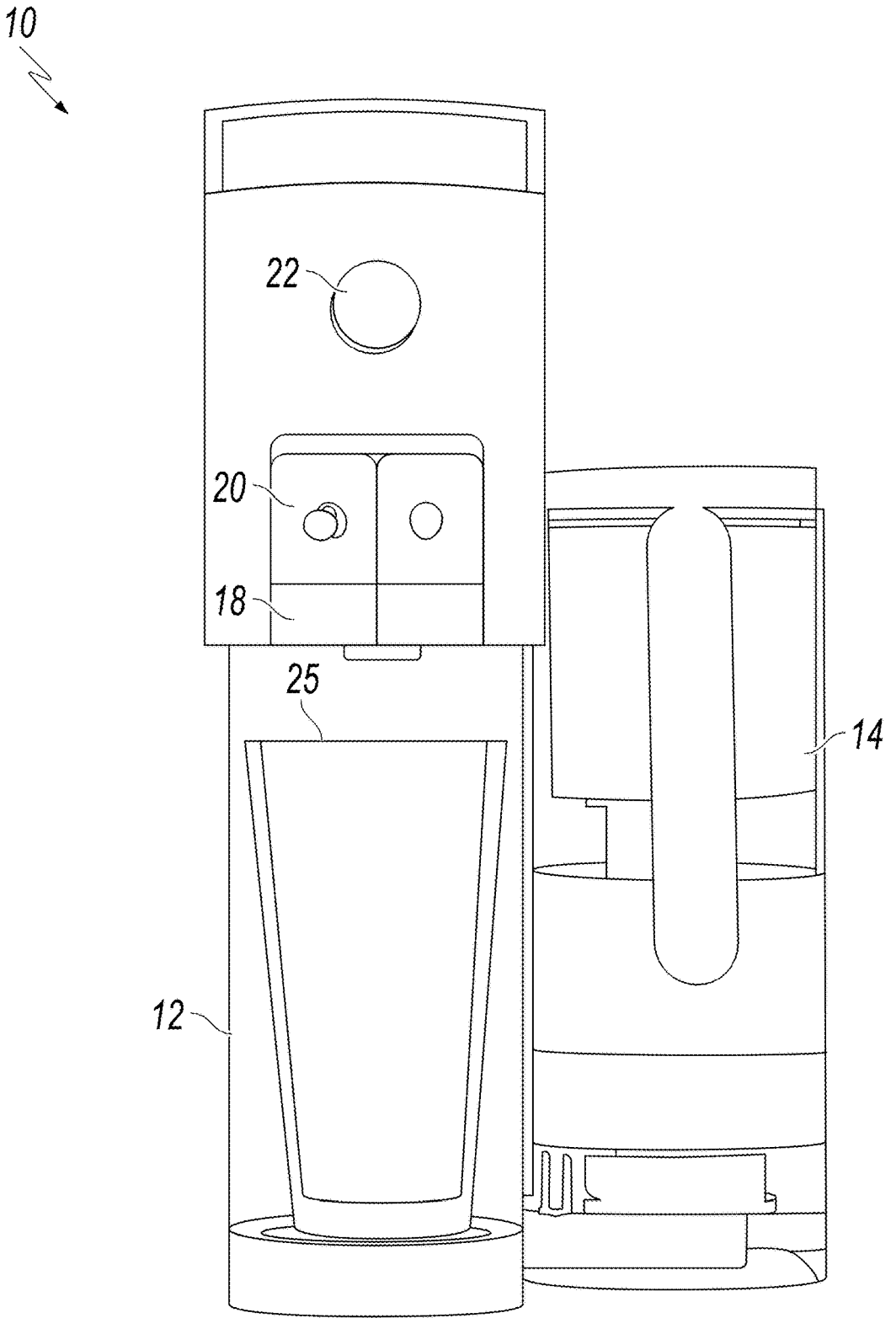
FIG. 1 is a front view of one embodiment of a beverage dispensing system.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain illustrative embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting illustrative embodiments and that the scope of the present invention is defined solely by the claims. The features illustrated or described in connection with one illustrative embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

In general, additive containers for use with beverage dispensers and carriages for receiving additive containers are provided. In one embodiment, an additive container is provided that can contain an additive for use in a beverage dispensing process. The additive container can have a housing having a hollow interior configured to retain a liquid therein. The housing can include an inlet and outlet configured to control the flow of fluid into and out of the hollow interior. In some embodiments, the inlet and/or the outlet can have a seal disposed therein that is configured to open in the presence of a pressure differential between an interior and an exterior of the additive container in an attempt to eliminate the pressure differential. In some embodiments, the inlet can have a snorkel tube that extends from the inlet into the hollow interior of the housing. The tube can be configured to deliver gas above a fluid level to allow a pressure with the housing to be increased. In other embodiments, the housing can has a cover disposed over an opening, and an inlet and outlet formed in a wall of the housing. In yet other embodiments, additive containers having a shape and design that corresponds to a carriage located on a beverage dispensing device are provided. The carriage can have complimentary features to receive and retain the additive container, and when retained, the additive container can be employed by a beverage dispensing device for use in the creation of customized beverages. In another embodiment, an adapter is provided that can form an interface between an additive container and a beverage dispensing system. The adapter can be configured to couple to a carriage and may be shaped and designed to correspond to the carriage. The additive container can include tubing configured to couple the container to the adapter. In other aspects, an additive container is provided having an enlarged interior volume.

Methods of dispensing an additive stored within the additive container can vary. In some embodiments, the additive container is pressurized with a gas, such as air, to cause the outlet to open and dispense the stored additive. When the additive container is properly seated and retained by a carriage, a gas line fluidly coupled to a pump can receive the inlet of the additive container or the inlet of the adapter in order to seal around the inlet in preparation for the introduction of gas into the additive container during a dispensing procedure. Gas can be pumped by the pump, though the gas line, through the inlet, and into the hollow interior of the additive container. The resulting increase in internal pressure can cause the outlet seal to open and dispense an amount of the additive proportional to the amount of gas introduced through the inlet.

Examples of beverage dispensing systems, additive containers, and associated methods beyond that which are described herein can be found in U.S. application Ser. No. 17/989,640, titled "Carbonation System Ingredient Container," which is incorporated by reference in its entirety.

Figure 2:
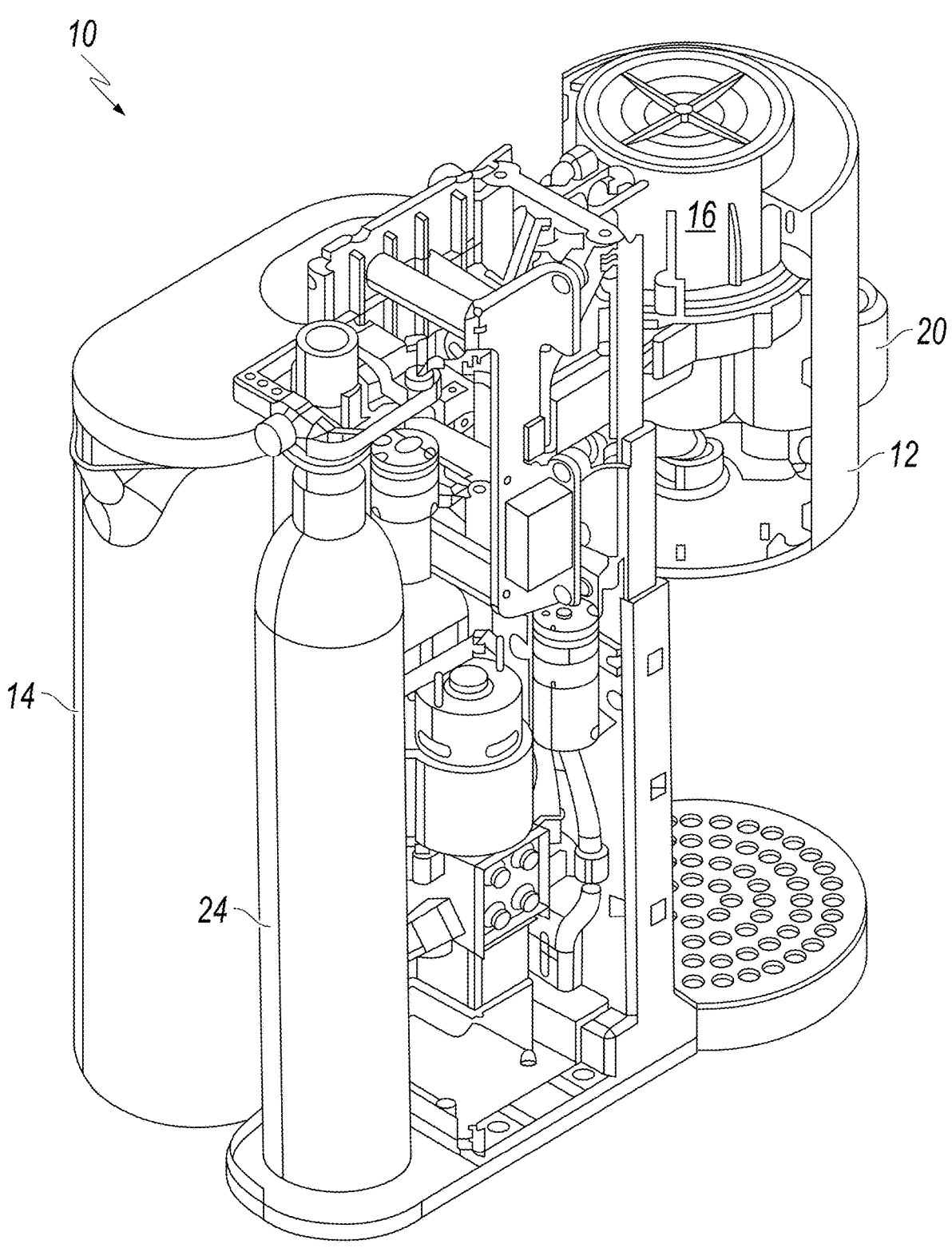
FIG. 2 is a rear perspective view of the beverage dispensing system of FIG. 1 with various housing components removed.

FIGS. 1-2 illustrate a beverage dispensing system 10 according to one embodiment. The beverage dispensing system 10 can be used to create and dispense customized beverages for a user, based on desired characteristics of the beverage. The illustrated beverage dispensing system 10 generally includes a housing 12 having a fluid reservoir 14 and a carbonation assembly 16. A carriage assembly 18 can be included on and/or coupled to the beverage dispensing system 10, and it can receive one or more additive containers and/or adapters (as described herein) to be used in the creation of beverages. The additive containers can include one or more additives (e.g., a flavorant, a vitamin, a food dye, etc.) to be included in a created beverage as desired.

During a beverage dispensing process, a user can actuate inputs located at a user interface 22 in order to select specific characteristics of the desired beverage, such as volume, carbonation level, specific additives, and additive amount. If the user selects inputs to indicate that the beverage is carbonated, water can be fed from the fluid reservoir 14 and into the carbonation assembly 16, and carbon-dioxide can be fed from a canister 24 and into the carbonation assembly 16 to produce carbonated water. If the user selects inputs to indicate that one or more additives should be added to the beverage, the beverage dispensing system 10 can dispense the additive from the one or more additive containers 20 coupled to the system. The beverage can be dispensed into a container, such as a drinking glass 26.

Figure 3:
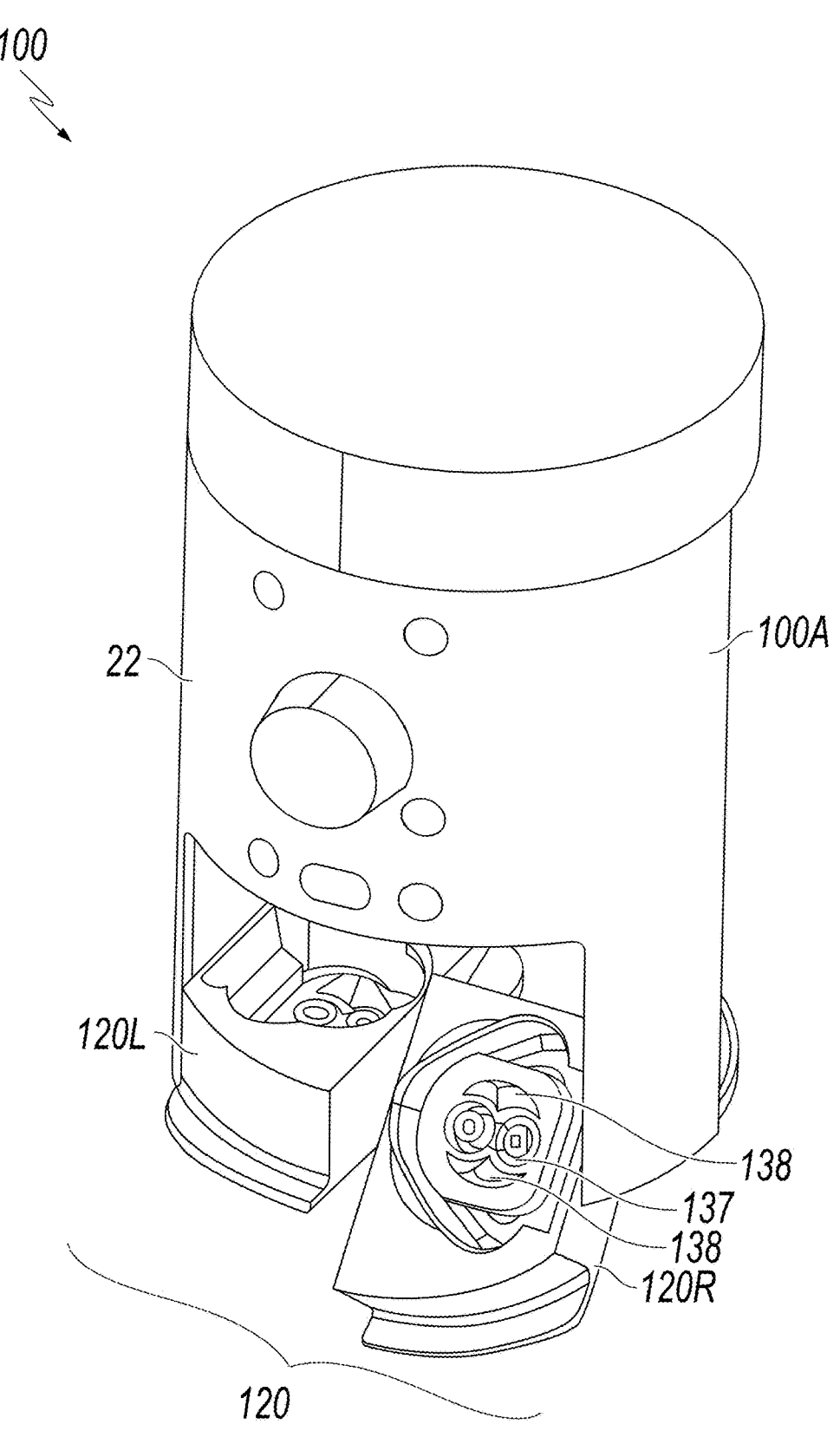
FIG. 3 is a front perspective view of one embodiment of a housing portion and carriage assembly for use with a beverage dispensing system.

FIG. 3 illustrates one embodiment of a carriage assembly 100 which can be coupled to and/or retained with or within a beverage dispensing device, such as beverage dispensing device 10. In the illustrated embodiment, the carriage assembly 100 is contained within a carriage housing 100A. The carriage assembly 100 can include one or more carriages 120, which can each seat and retain one or more additive containers (see, e.g., FIGS. 4A-5B, 8A-8B) and/or adapters (see, e.g., FIGS. 6A-6F) for use in a beverage dispensing process as explained herein. Although the carriage assembly 100 is shown having two separately movable carriages 120, a different number of carriages 120 are contemplated herein as well. For example, the carriage assembly can be in the form of a single movable carriage having one or more cavities with each cavity configured to receive an additive container. Additive containers and their retention within the carriage assembly 100 will be described in greater detail below.

The carriages 120 may include at least one groove and/or protrusion that complements at least one protrusion and/or groove of an additive container or adapter. For example, as seen in FIG. 3, a carriage 120 may include two bat-wing shaped protrusions 138 at least partially surrounding a substantially figure-8 shaped central recess 137. Although the carriages 120 are described and shown as having certain areas recessed and other areas protruding, carriages 120 with the opposite features are contemplated herein as well, i.e., one or more protrusions are recesses and one or more recesses are protrusions.

Figure 4A:
FIG. 4A is a perspective view of an additive container according to an embodiment.
Figure 4A:
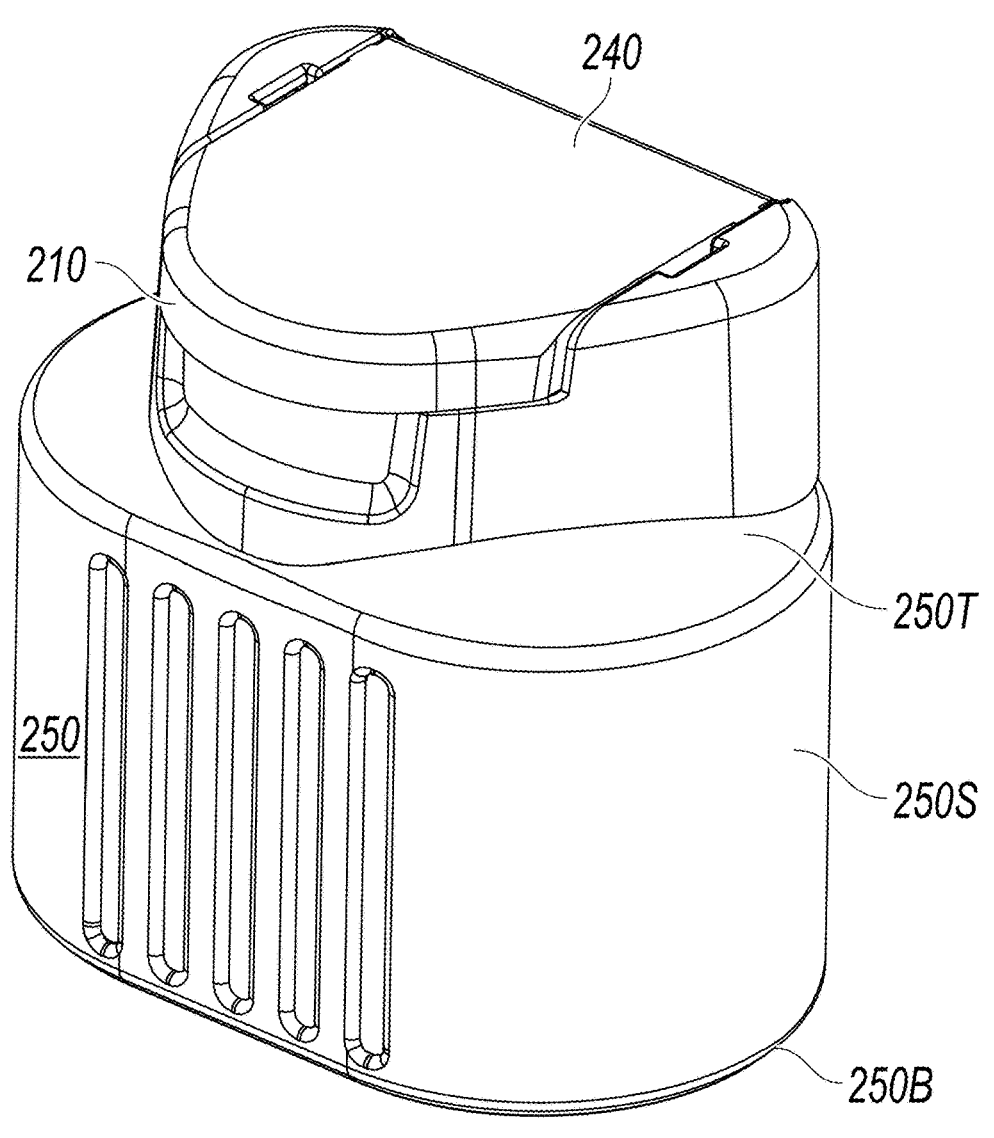
Figure 4B:
FIG. 4B is a perspective view of a cap of the additive container of FIG. 4A having a lid shown in an open configuration.
Figure 4B:
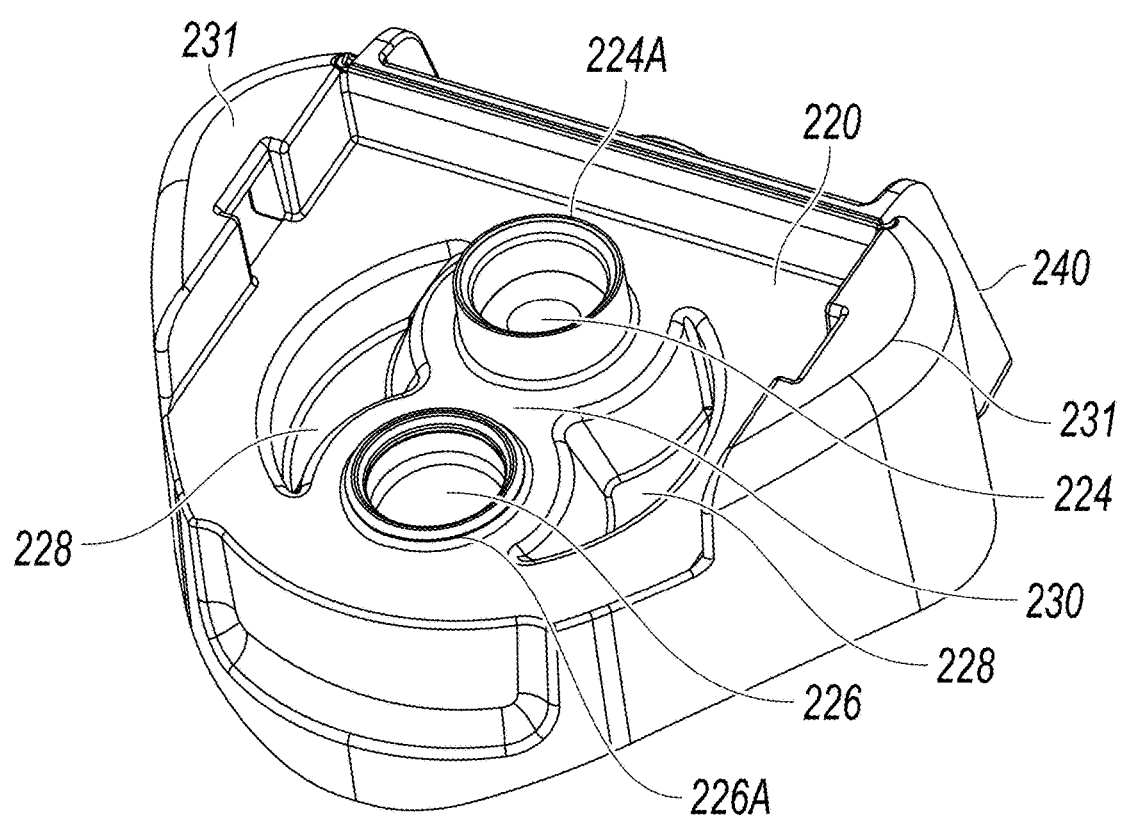
Figure 4C:
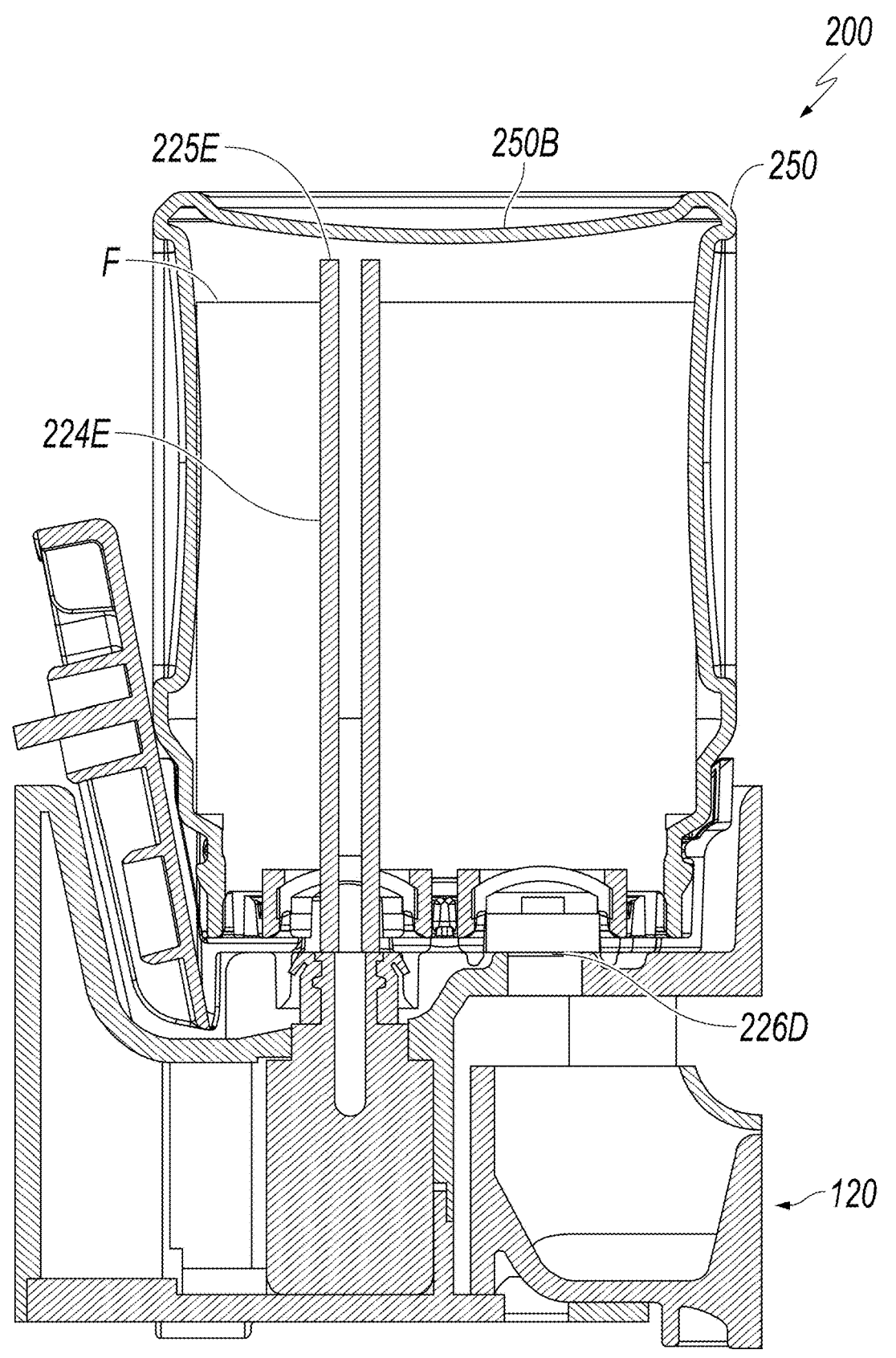
FIG. 4C is a cross-sectional view of the additive container of FIG. 4A docked in a carriage of a beverage dispensing system and showing a snorkel tube disposed therein.

FIGS. 4A-4C illustrate an exemplary embodiment of an additive container 200. The illustrated additive container 200 generally includes a cap 210 coupled to a housing 250 which can be configured to contain an additive (e.g., a flavorant, a supplement, a vitamin, a coloring agent, etc.) to be used in the creation of beverages. The additive can be in the form of a fluid, a solid, a powder, a gel, a syrup, or any other form. The additive container 200 can come in a variety of sizes.

The additive container 200 can store the additive inside, and, as part of a beverage creation process, receive a measured volume of gas (e.g., air, carbon-dioxide, etc.) through an inlet 224 resulting in an increased internal pressure. The increase in internal pressure within the additive container 200 can result in an outlet 226 emitting a tailored amount of the additive as a consequence of eliminating or reducing the newly-created pressure differential across the outlet.

The illustrated housing 250 includes a base 250B, a sidewall 250S extending upwardly from the base, and a top 250T, which together can define an interior space to store the additive. The illustrated housing 250 has a generally oblong, ovular form similar to a race-track configuration, as seen in FIG. 4A. While the housing 250 is shown as having a specific form, the housing 250 can take on a variety of forms.

FIG. 4B depicts an embodiment of the cap 210 and elements thereof. The illustrated cap 210 has a substantially rounded triangular shape and includes a cap base 220 and a cap cover 240 coupled to the cap base 220 via, e.g., a living hinge. The cap cover 240 can be used to close an inlet and outlet discussed further below. The triangular shape can be defined by a perimeter having first, second, and third sides, with the first side being longer than each of the second and third sides. While the cap 210 is shown as having a specific form, the cap 210 can take on a variety of forms.

As indicated above, the cap 210 can include an inlet 224 and an outlet 226, as shown in FIG. 4B. The inlet 224 and outlet 226 can be spaced a distance apart from one another, and can be aligned with one another along an axis extending therethrough, with a central longitudinal axis of each of the inlet and outlet being parallel. In other embodiments, the inlet 224 and outlet 226 can be offset and unaligned relative to one another and/or can have central longitudinal axes that are non-parallel. In other embodiments, the inlet and outlet can be concentric and need not be spaced apart.

As seen in FIG. 4B, the inlet 224 can include an inlet collar 224A and the outlet 226 can include an outlet collar 226A, with the collars defining an opening within the inlet or outlet. Although the inlet collar 224A and the outlet collar 226A are shown in a circular form, the inlet and outlet collars 224A, 226A can take on a number of shapes, including various geometric shapes, e.g., a triangle, a star, etc., as well as fanciful and/or irregular shapes, e.g., a letter, a logo, etc. The form of the inlet and outlet collars 224A, 226A can be the same or different. Further, the inlet 224 and outlet 226 need not include collars, and instead can be in the form of openings formed in a wall of the cap.

As seen in FIG. 4B, the cap base 220 can further include a pair of shoulders 231 that extend upward from the cap base 220. Each shoulder 231 can have a shape that complements a shape of the carriage 120. Recesses 228 can flank each side of the inlet 224 and the outlet 226, and the recesses 228 can each be shaped to correspond to protrusions in a carriage (e.g., flanking protrusions 138 on carriage 120). For example, the recesses 228 can be shaped to follow an outer contour of the collars 224A, 226A and can take a "bat wing" form. In particular, similar to the flanking protrusions 138, the recesses 228 can have a radially outward sidewall that is concavely curved along its length and two inner sidewalls that are concavely curved to follow the contours of the inlet and outlet 224, 226. The recesses 228 can take on various other forms as well, and their form may be at least partially dependent upon the placement and form of other components on the cap 210 and/or the carriage. The recesses 228 can be placed a slight distance apart from the inlet 224 and the outlet 226, thus defining a central pattern 230 located in the space between the collars 224A, 226A and the recesses 228. As best seen in FIG. 4B, the central pattern 230 can take the form of a "figure-8," however other forms may be present. The illustrated central pattern 230 is shown being flush with the upper surface of the base 220, however the central pattern 230 can protrude above the upper surface or can be recessed below the upper surface. The central pattern 230 can be a protrusion, a recession, or a combination thereof with a portion of the central pattern 230 protruding from the cap 210 and a portion of the central pattern 230 receding into the cap 210. In some variations, the inlet and outlet collars 224A, 226A can contribute to the central pattern 230.

As explained previously with respect to the carriage 120, although the cap base 220 is described and shown as having certain areas recessed and other areas protruding, cap bases with the opposite features are contemplated herein as well, e.g., all protrusions are recessed and all recesses are protrusions. Further, cap bases are also contemplated that may have only a portion of the features interchanged, such that only one or a few protrusions are recessed and/or only one or a few recesses are protrusions. Additionally, and as described in further detail below, cap bases are contemplated that may have fewer protrusions and/or recesses.

The outlet 226 can include an outlet valve 226D configured to open to dispense an additive therefrom during a beverage dispensing process. The outlet valve 226D can be configured to open when subjected to a high enough pressure differential, such as when gas is introduced to the hollow interior of the housing 250 via the inlet 224. One exemplary valve is a slit valve. Further details regarding the valve are disclosed in the aforementioned application incorporated by reference herein.

As seen in FIG. 4C, the inlet 224 may include an inlet tube 224E fluidly coupled thereto. As illustrated, the inlet tube 224E can extend from the inlet 224 into the hollow interior of the housing 250, extending toward a wall of the housing 250 opposite the inlet 224, e.g. the base 250B of the housing 250. The inlet tube 224E may be configured to terminate proximate to an interior wall of the housing 250 opposite the inlet 224, e.g. the base of the housing 250. The additive container 200 may be configured to couple to carriage 120 such that inlet tube 224E extends in an upward direction away from the carriage, with the base forming a top of the container and the inlet and outlet being positioned at a bottom of the container. Such configuration can allow an open end 225E of the inlet tube 224E to be positioned above a level of fluid F within the container, as shown. This allows gas to be introduced into the empty space within the container, while also preventing fluid in the container from flowing into the inlet tube 224E and out the inlet 224.

A person skilled in the art will appreciate that the inlet tube 224E can be coupled to the inlet 224 using a variety of techniques. For example, the inlet tube 224E may be removably mounted by friction fit or other known techniques on a projection extending into the housing 250 from the inlet 224. In other aspects, the inlet tube 224E can be integrally formed with the cap 210. In other aspects, the inlet tube 224E can be passed through the inlet 224 in the cap 210 and fixed thereto, e.g., by adhesive or welding. While various attachment techniques can be utilized, the inlet 224 and inlet tube 224E are preferably configured to couple to a gas outlet on a beverage dispensing system (e.g., beverage dispensing system 10) to allow gas to be pumped through the inlet tube 224E into the housing.

While not shown, to further prevent fluid flow into the inlet tube 224E during rotation of the container 200 to position the inlet 224 and outlet 226 in a downward orientation as shown in FIG. 4C, rather than the upward orientation shown in FIG. 4A, the inlet 224 and/or inlet tube 224E can include one or more one way valves therein. Such a valve can allow air to flow through the tube 224E and out the open end 225E, while preventing any air and/or fluid from flowing in the reverse direction.

As indicated above, in use the inlet tube 224E can be configured to introduce at least one gas to the interior of the housing 250 from a beverage dispensing system (e.g., beverage dispensing system 10) during a beverage dispensing process, and as a result of the introduction of the at least one gas, dispense an additive stored therein. This can be achieved by orienting the additive container 200 with the inlet 224 and outlet 226 facing downward and fluidly coupling the inlet 224 to a gas outlet on the beverage dispensing system. When air is pumped through the inlet 224 and inlet tube 224E it is delivered into the hollow interior at a location about the fluid, thereby creating pressure within the hollow interior. The pressure causes the fluid to apply a force to the outlet valve 226D, and once the force exceeds an opening or cracking pressure of the outlet valve 226D, the valve 226D will open and release fluid. An amount of gas dispensing into the container 200 can be controlled to thereby control an amount of fluid dispensed from the container 200.

Figure 5A:
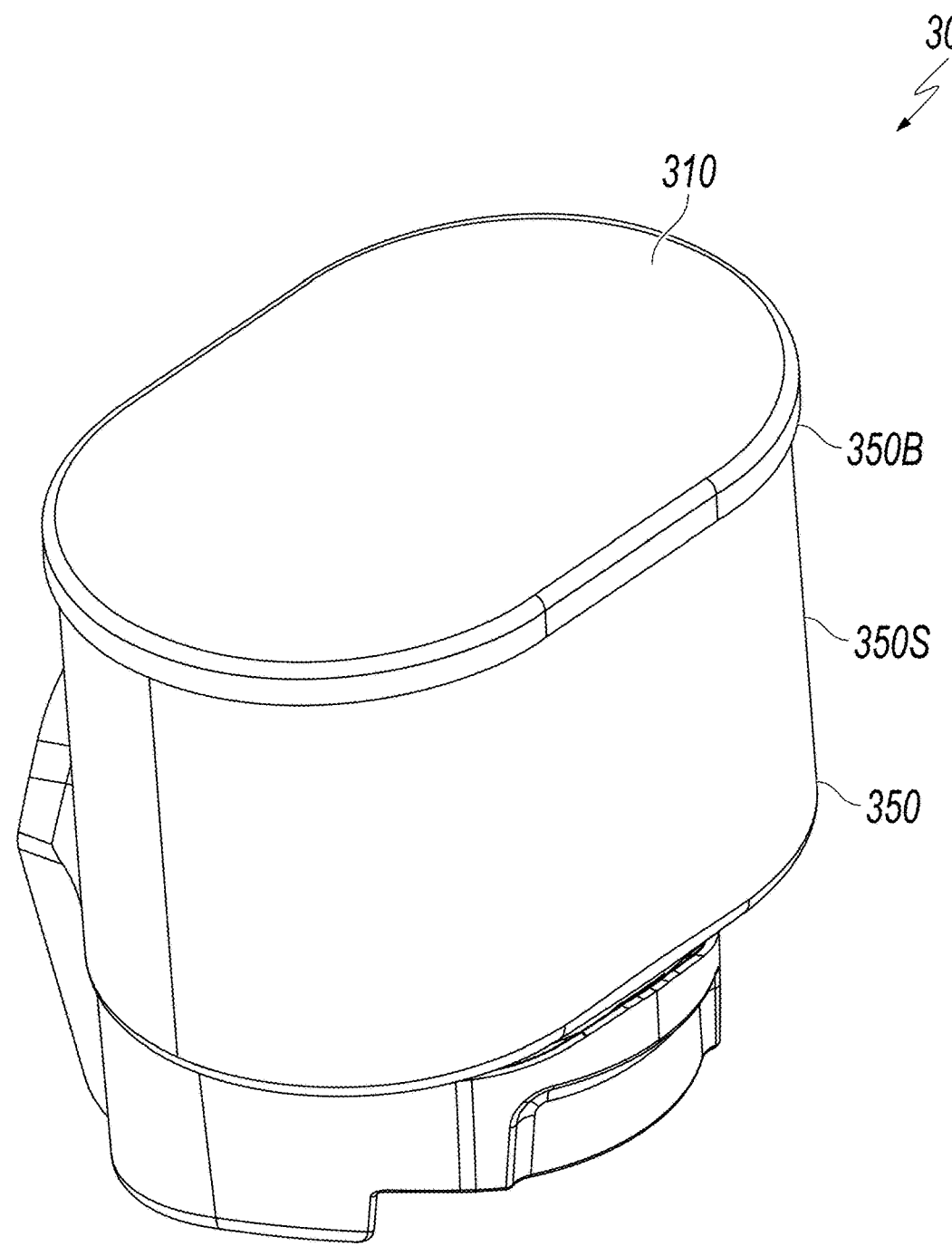
FIG. 5A is a perspective view of an additive container having a cover opposite an inlet and an outlet according to another embodiment.
Figure 5B:
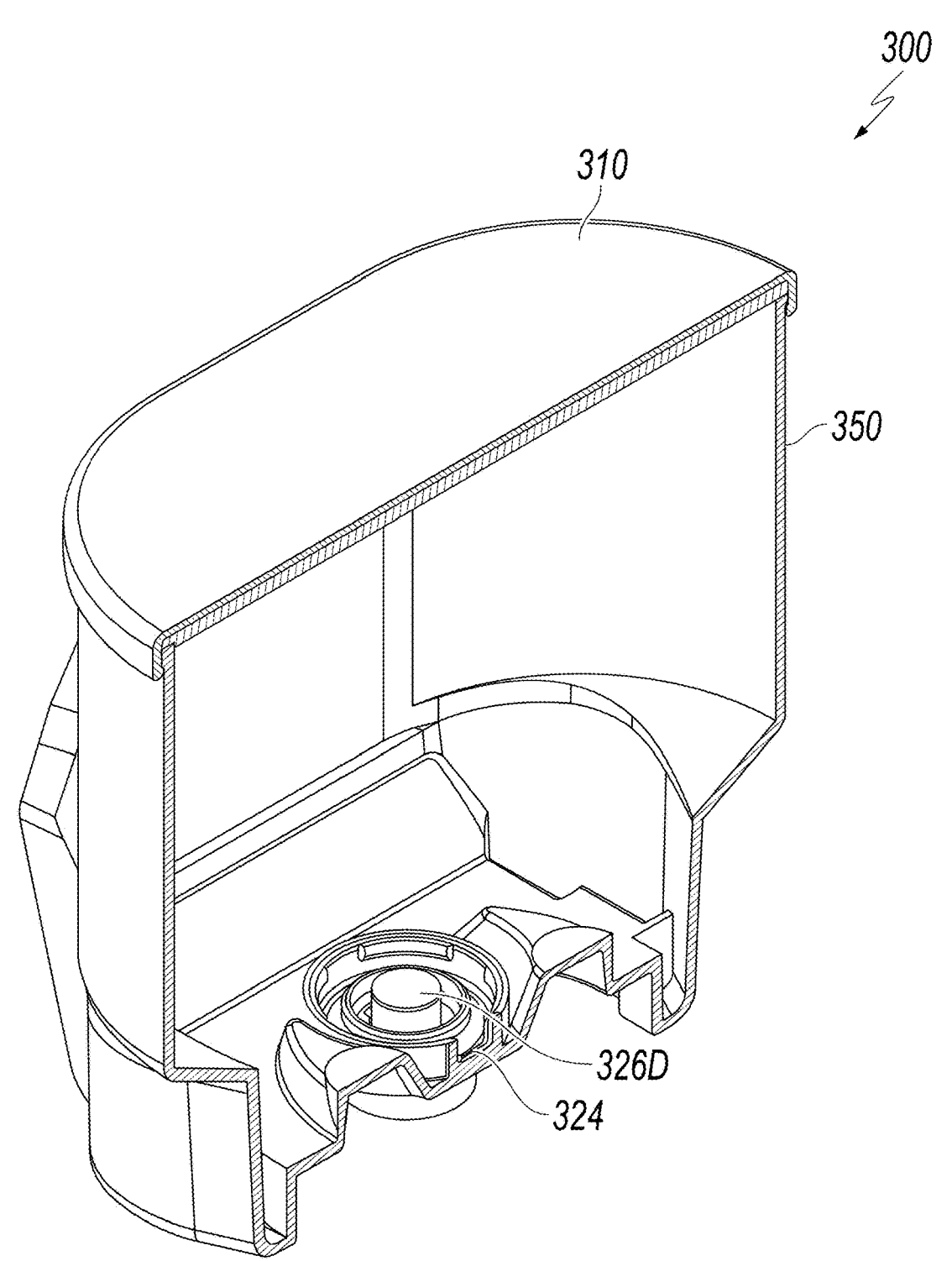
FIG. 5B is a cross-sectional view of the additive container of FIG. 5A.

FIGS. 5A and 5B depict another embodiment of an additive container 300 configured to contain an additive (e.g., a flavorant, a supplement, a vitamin, a coloring agent, etc.) to be used in the creation of beverages. The additive can be in the form of a fluid, a solid, a powder, a gel, a syrup, or any other form. The additive container 300 may come in a variety of sizes. The additive container 300 can store the additive inside, and, as part of a beverage creation process, receive a measured volume of gas (e.g., air, carbon-dioxide, etc.) through an inlet 324 resulting in an increased internal pressure. The increase in internal pressure within the additive container 300 can result in an outlet 326 emitting a tailored amount of the additive as a consequence of eliminating or reducing the newly-created pressure differential across the outlet.

As shown, the additive container 300 includes a housing 350 having a base 350B at a first end and a sidewall 350S extending upwardly from the base 350B to an interface 320 at a second end opposite the first end. The illustrated housing 350 has a generally oblong, ovular form similar to a racetrack configuration, as seen in FIGS. 5A and 5B. While the housing 350 is shown as having a specific form, the housing 350 can take on a variety of forms.

The base 350B can include a cover or lid 310 extending across an opening in the first end of the housing 350. The lid 310 can be configured to provide access to the hollow interior to allow for fluid to be delivered into the housing 350. The illustrated lid 310 has a generally oblong, ovular form. The lid 310 can be coupled to the housing 350 to close the opening formed by housing 350 and close off and seal the hollow interior. The lid 310 can couple to the housing 350 via a snap-fit, a living hinge, or various other coupling mechanisms. The lid 310 can be pivotally coupled to the housing 350, or can be fully removable. While the lid 310 is shown as having a specific form, the lid 310 can take on a variety of forms.

Figure 5C:
FIG. 5C is a perspective view of the additive container of FIG. 5A.

As indicated above, the housing 350 can include an interface 320 at an opposite end from the base 350B. The interface 320 can be a portion of the housing 350 configured to be received within and interact with a carriage in a beverage dispensing apparatus. In the illustrated embodiment, the interface 320 is an integral portion of (e.g., monolithic with) the housing 350. The interface 320 can have a shape that corresponds to a shape of the carriage 120. The shape can vary based on the beverage dispensing system. As further shown, the interface 320 can include the inlet 324 and the outlet 326 therein. As seen in FIG. 5C, in the illustrated embodiment the inlet 324 includes an inlet collar 324A and the outlet 326 includes an outlet collar 326A, with the collars defining an opening within the inlet or outlet. Although the inlet collar 324A and the outlet collar 326A are shown in a circular form, the inlet and outlet collars 324A, 326A can take on a number of shapes, including various geometric shapes, e.g., a triangle, a star, etc., as well as fanciful and/or irregular shapes, e.g., a letter, a logo, etc. The form of the inlet and outlet collars 324A, 326A can be the same or different. Further, the inlet and the outlet need not include a collar and instead can be in the form of an opening formed in the end wall of the housing.

As seen in FIG. 5C, the interface 320 can further include a pair of shoulders 331 that extend upward from the interface 320. Each shoulder 331 can have a shape that complements a shape of carriage 120.

In some embodiments, recesses 328 can flank each side of the inlet 324 and the outlet 326, and the recesses 328 can each be shaped to correspond to protrusions in a carriage (e.g., protrusions 138 on carriage 120). For example, the recessed 328 can be shaped to follow an outer contour of the collars 324A, 326A and can take a "bat wing" form. In particular, similar to the protrusions 138, the recesses 328 can have a radially outward sidewall that is concavely curved along its length and two inner sidewalls that are concavely curved to follow the contours of the inlet and outlet 324, 326. The recesses 328 can take on various other forms as well, and their form may be at least partially dependent upon the placement and form of other components on interface 320. The recesses 328 can be placed a slight distance apart from the inlet 324 and the outlet 326, thus defining a central pattern 330 located in the space between the collars 324A, 326A and the recesses 328. As best seen in FIG. 5C, the central pattern 330 can take the form of a "figure-8," however other forms may be present. The illustrated central pattern 330 is shown being flush with an upper surface of the interface 320, however the central pattern 330 can protrude above the upper surface or can be recessed below the upper surface. The central pattern 330 can be a protrusion, a recession, or a combination thereof with a portion of the central pattern 330 protruding from the interface 320 and a portion of the central pattern 330 receding into the interface 320. In some variations, the inlet and outlet collars 324A, 326A can contribute to the central pattern 330.

As explained previously with respect to the carriage 120, although the interface 320 is described and shown as having certain areas recessed and other areas protruding, bases of housings with the opposite features are contemplated herein as well, i.e., all protrusions are recessed and all recesses are protrusions. Further, bases of housings are also contemplated that may have only a portion of the features interchanged, such that only one or a few protrusions are recessed and/or only one or a few recesses are protrusions.

The outlet 326 may include an outlet valve 326D configured to open to dispense an additive therefrom during a beverage dispensing process. The outlet valve 326D can be configured to open when subjected to a high enough pressure differential, such as when gas is introduced to the hollow interior of the housing 350 via inlet 324. As seen in FIG. 5C, the inlet 324 can also include an inlet valve 324D configured to introduce a gas to the interior of the housing 350 during a beverage dispensing process.

In use, the interface 320 of the housing can be positioned facing downward, such that the inlet 324D and outlet 326D are oriented downward and the base 350B is positioned at the opposite end and is oriented upward. The interface 320 can be received within a carriage to couple the inlet 324D to a gas pump for delivering gas into the housing. The lid 310 can be sealed with respect to the housing to allow a pressure within the housing to be maintained. Gas can thus be pumped into the housing through the inlet to increase the pressure, and thereby cause fluid in the housing to be dispensed by the outlet, as previously described with respect to other embodiments herein.

In yet another embodiment, rather than having valves located on or formed as part of the ingredient container, an adapter can be provided that can be used to couple an ingredient container to a beverage dispensing system. FIGS. 6A-6F illustrate one embodiment of an adapter system that can function as an interface between a beverage dispensing system 10 and a container. The adapter 400 can be configured to couple with the carriage 120 in order to facilitate the dispensing of an additive stored in a container 470 that is separate from the carriage 120, as will be described in greater detail below. Use of the adapter 400 allows connection of almost any size external container 470 without constraint. While not shown, in other embodiments the adapter can be configured to function as a lid on a container, or it can be configured to directly receive a container thereon. For example, a container having a seal can be coupled directly to the adapter, and a portion of the adapter can be configured to puncture the seal upon mating.

As shown in FIGS. 6A-6D, the illustrated adapter 400 has a substantially rounded triangular shape and includes a bottom surface 410 and an upper surface 420. The triangular shape can be defined by a perimeter having first, second, and third sides, with the first side being longer than each of the second and third sides. While the adapter 400 is shown as having a specific form, the adapter 400 can take on a variety of forms. The illustrated form is merely provided to correspond to the shape of the illustrated carriage assembly.

Figure 6A:
FIG. 6A is a perspective view of an adapter configured to form an interface between an additive container and a carriage of a beverage dispensing system according to an embodiment.
Figure 6A:
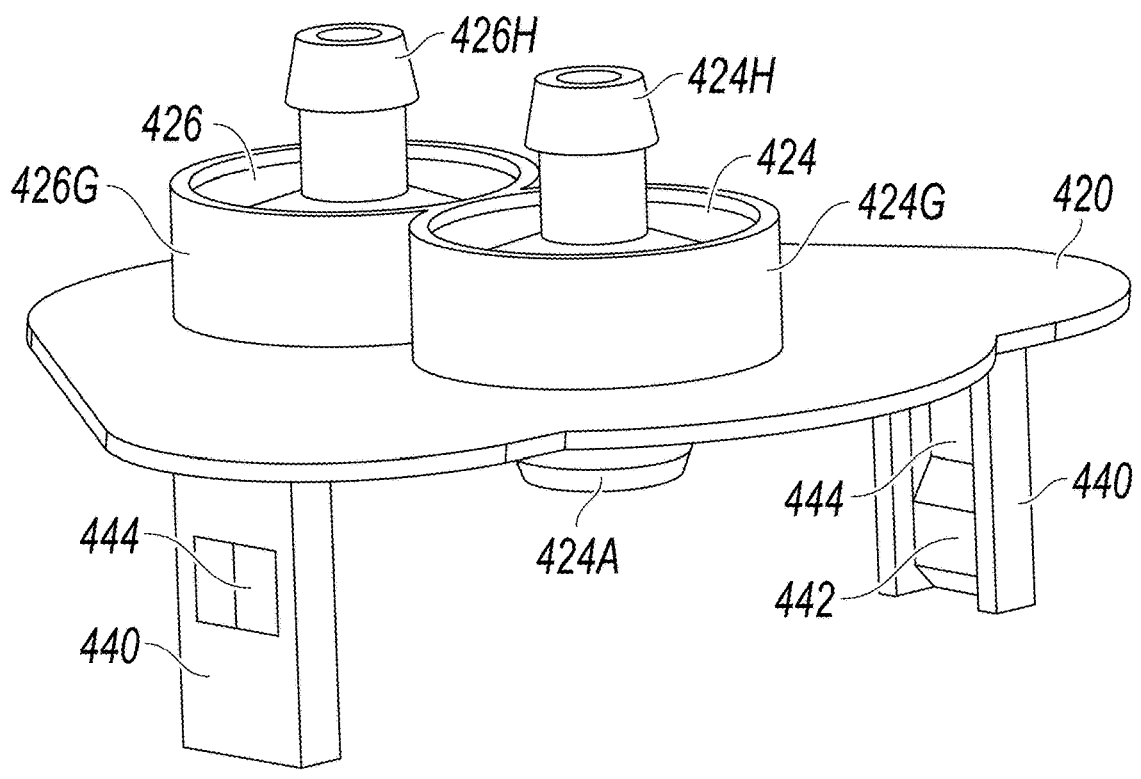
Figure 6B:
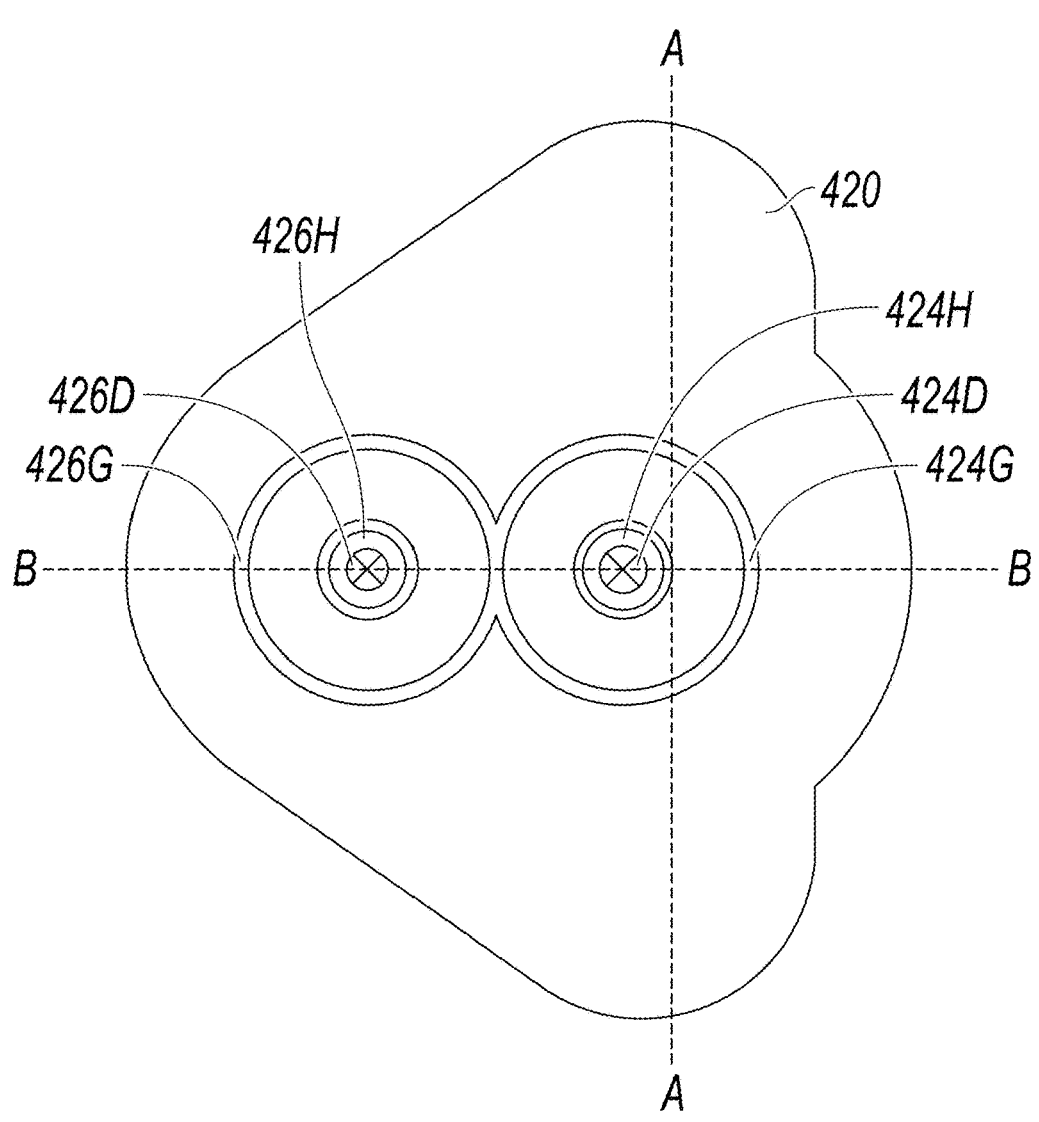
FIG. 6B is a top view of the adapter of FIG. 6A.

The adapter 400 can have a minor axis B and a major axis A, and the adapter 400 can be substantially symmetrical about the minor axis B. The adapter 400 can include an inlet 424 and outlet 426 that extend through the adapter 400 from the upper surface 420 to the bottom surface 410. The inlet 424 and outlet 426 can be positioned on the adapter 400 such that the inlet 424 and outlet 426 are aligned along the minor axis. In other embodiments, the inlet 424 and outlet 426 can be positioned on the adapter 400 in an offset manner, unaligned along the minor axis. As seen in FIGS. 6A and 6D, the inlet 424 can include an inlet collar 424A disposed on the bottom surface 410 of the adapter 400, defining an opening of the inlet 424. Although the inlet collar 426A is shown in a circular form, the inlet collar 424A can take on a number of shapes, including various geometric shapes, e.g., a triangle, a star, etc., as well as fanciful and/or irregular shapes, e.g., a letter, a logo, etc. In other embodiments, the inlet can be in the form of an opening without any collar.

Figure 6C:
FIG. 6C is a right side view of the adapter of FIG. 6A.
Figure 6C:
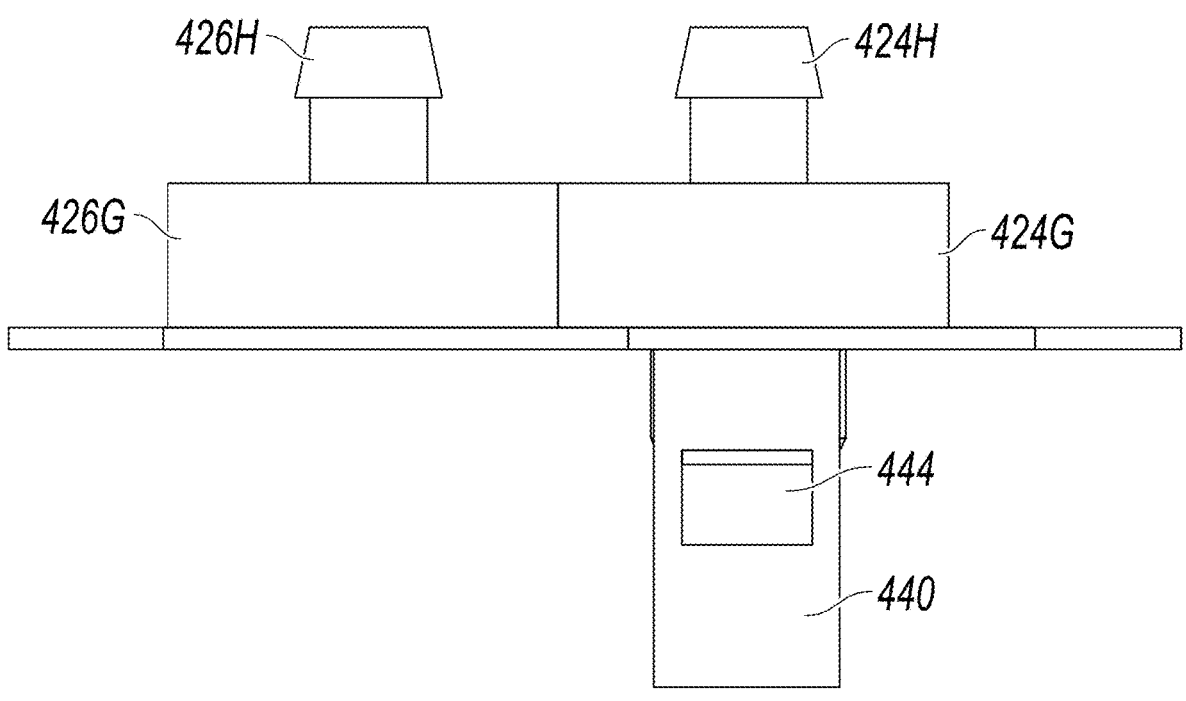
Figure 6D:
FIG. 6D is a bottom view of the adapter of FIG. 6A.
Figure 6D:
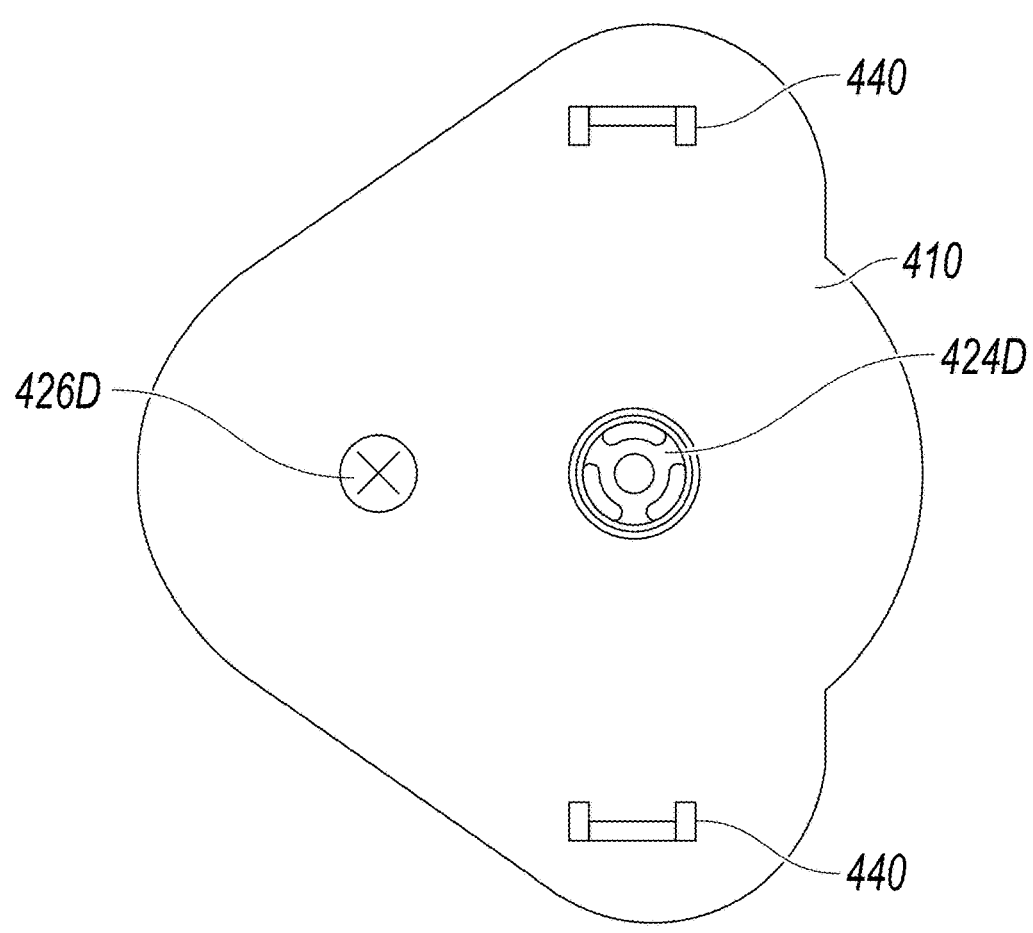

As shown in FIGS. 6A and 6C, the adapter 400 may include at least one anchor 440 disposed on the bottom surface 410 of the adapter 400. The at least one anchor 440 can extend outwardly from the bottom surface 410 of the adapter 400 and can include a detent 442 to receive a corresponding protrusion in a carriage assembly. The anchor 440 can include a window 444 above the detent 442. The at least one anchor 440 and detent 442 can couple with features of the carriage 120 in order to facilitate coupling of the adapter 400 to the carriage 120. The at least one anchor 440 can take on various other forms as well, and its form may be at least partially dependent upon the placement and form of components on carriage 120. For example, in other aspects the detent can be on the carriage and the anchor can have a projection. The adapter 400 can have two anchors 440 disposed on bottom surface 410, extending downward from opposed ends across the inlet and outlet ports, as seen in FIG. 6D.

As further shown, the adapter 400 can include connection collars 424G, 426G disposed on upper surface 420. One connection collar 424G can define an opening of inlet 424, and the other connection collar 426G can define an opening of outlet 426. The inlet 424 and outlet 426 can each include a flared connection point 424H, 426H. The adapter 400 can include one or more of an inlet valve 424D and an outlet valve 426D, located within the inlet 424 and outlet 426, respectively. Each valve can have a configuration similar to the valves previously described.

Figure 6E:
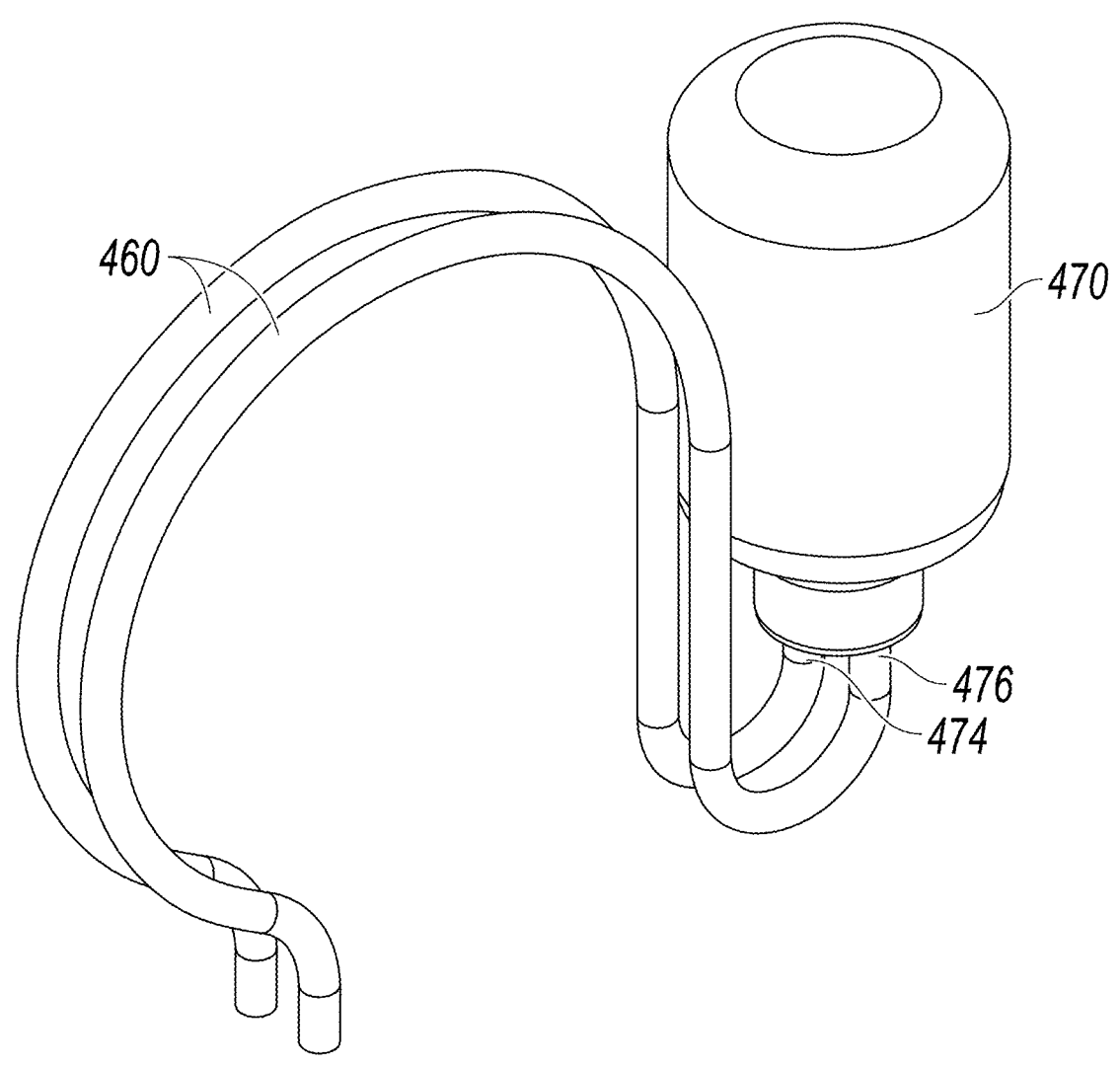
FIG. 6E is a perspective view of an additive container and tubing for use with the adapter of FIG. 6A.

FIG. 6E depicts the external container 470. The container 470 can have a variety of shapes and sizes as it is not directly coupled to the carrier 120. The container 470 can include an inlet 474 and an outlet 476. In some embodiments, the container 470 can include one or more of an inlet valve 474D and an outlet valve 476D, located within the inlet 474 and outlet 476, respectively. This can be in addition to or instead of valves 424D, 426D located in the adapter 400.

Figure 6F:
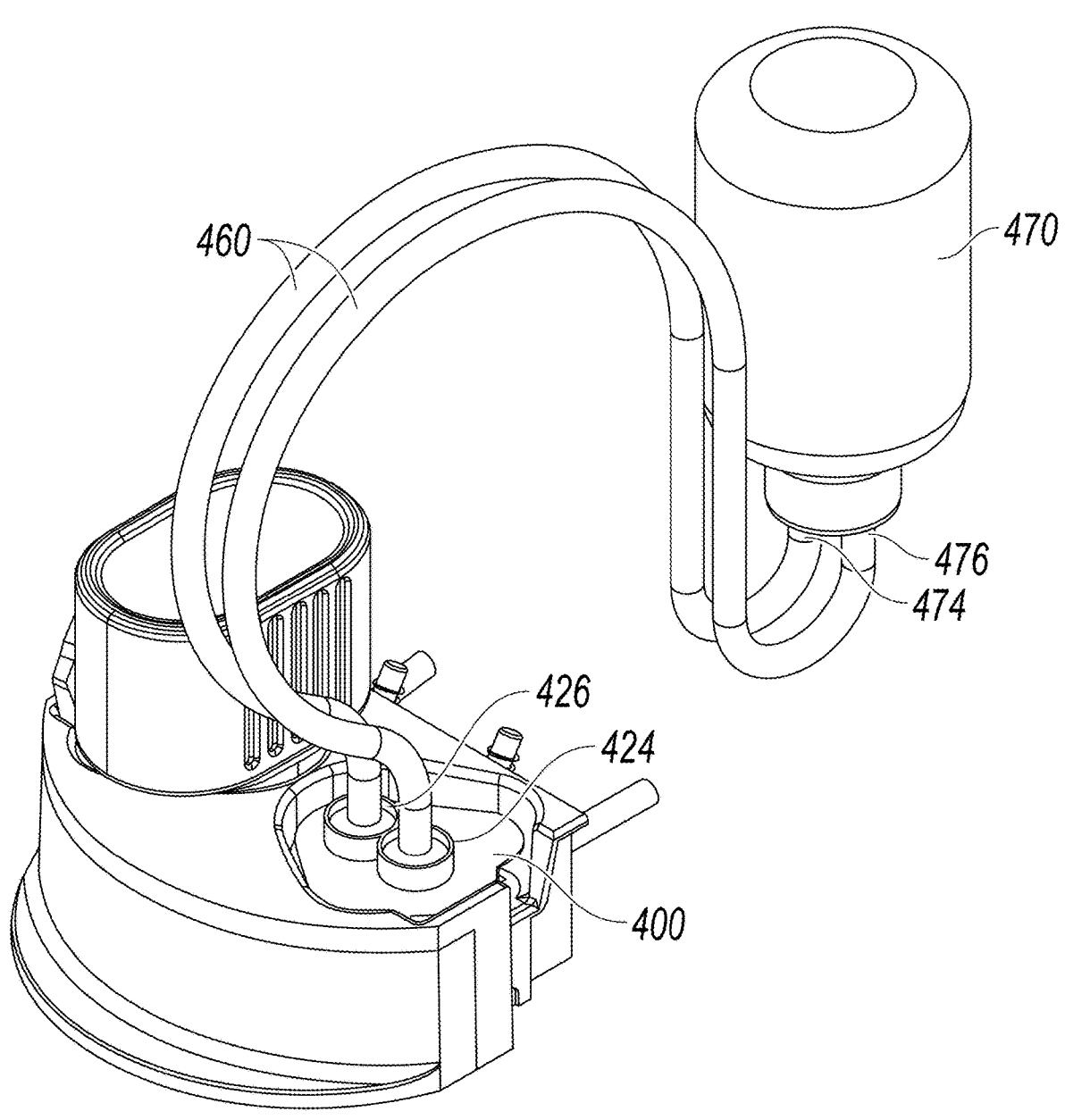
FIG. 6F is a perspective view of the adapter of FIG. 6A connected to a carriage of a beverage dispensing system and coupled to the container and tubing of FIG. 6E.

As seen in FIG. 6F, the adapter 400 may be coupled to the external container 470 via tubing 460. The tubing 460 may be flexible or rigid and provides fluid communication between the adapter 400 and the external container 470. The tubing 460 can comprise two tubes. One tube of tubing 460 may connect the container inlet 474 to the adapter inlet 424, and another tube of tubing 460 may connect the container outlet 476 to the adapter outlet 426. The tubing 460 can be coupled to the adapter 400 by inserting the flared connection points 424H, 426H into the tubes of tubing 460. The tubing 460 may be used to introduce gas into the external container 470. This increases the pressure within the external container 470 and causes additive to exit via the container outlet 476.

While not pictured, the adapter 400 can include any of the features described herein, including collars, protrusions, recessions, etc. to aid in coupling the adapter 400 to the carriage 120.

When the additive container 200 or adapter 400 is properly seated in the carriage assembly 100, a beverage dispensing process can occur using the stored additive. A user can select their beverage preferences, specifying details including volume, carbonation level, additive type, additive amount, and more. When the selections are received by the dispensing system 10, a beverage can be dispensed with the selected characteristics.

If an additive is desired, air or another gas, including carbon dioxide, nitrogen, oxygen, and the like, can be pumped through a gas line and into the interior of the housing 250 through an inlet port in the carriage 120 and through the inlet 224 in the container 200. The resulting increase in pressure within the additive container 200 can cause the outlet valve 226D to open and additive to dispense through the outlet 226 and an outlet port of the carriage 120, into a drink container, such as the drinking glass 26 depicted in FIG. 1. In embodiments where the additive is a fluid, the additive can be dispensed at a certain dispensing flowrate under a certain pressure.

Figure 7A:
FIG. 7A is a perspective view of a cap of an additive container having a crescent-shaped depression according to another embodiment.
Figure 7A:
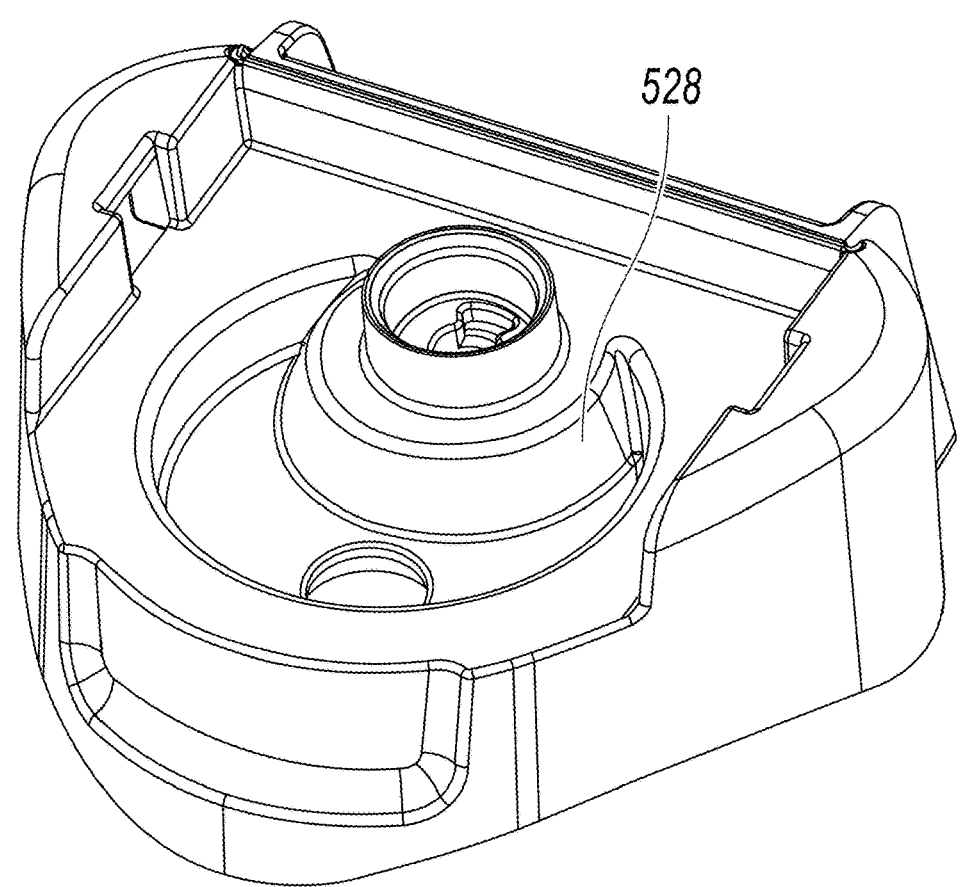
Figure 7B:
FIG. 7B is a top view of the cap of FIG. 7A.
Figure 7B:
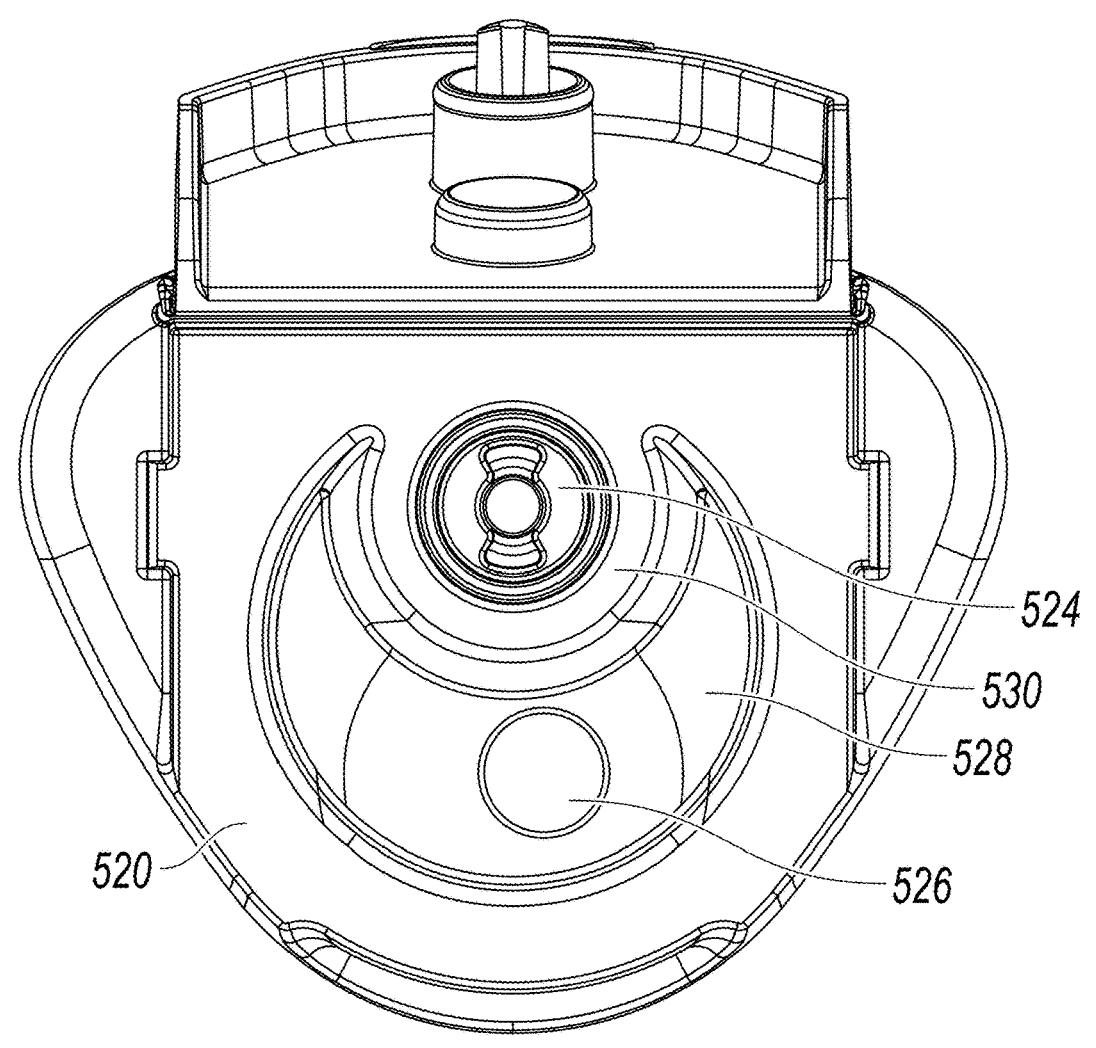

FIGS. 7A and 7B show another embodiment of cap 500 which can be integrally formed on a container or can be configured to couple to a container. The illustrate cap 500 has a cap base 520 with a single recess 528 having a crescent shape. The single recess 528 may have a sidewall that curves to follow the contour of only the inlet 524, and the outlet 526 may be flush with the lower surface of recess 528. A central pattern 530 may take the form of a partial circle around inlet 524. The single recess 528 may have a crescent or half-moon shape. Protrusions 138 of the carriage 120 may be configured to be inserted into the single crescent recess 528, and the circular central pattern 530 may be configured to be inserted into the central recess 137 of carriage 120.

As explained previously with respect to the carriage 120, although the cap base 520 is described and shown as having certain areas recessed and other areas protruding, cap bases with the opposite features are contemplated herein as well, i.e., all protrusions are recesses and all recesses are protrusions. Further, cap bases are also contemplated that may have only a portion of the features interchanged, such that only one or a few protrusions are recesses and/or only one or a few recesses are protrusions.

Figure 8A:
FIG. 8A is a perspective view of another embodiment of a housing of an additive container.
Figure 8A:
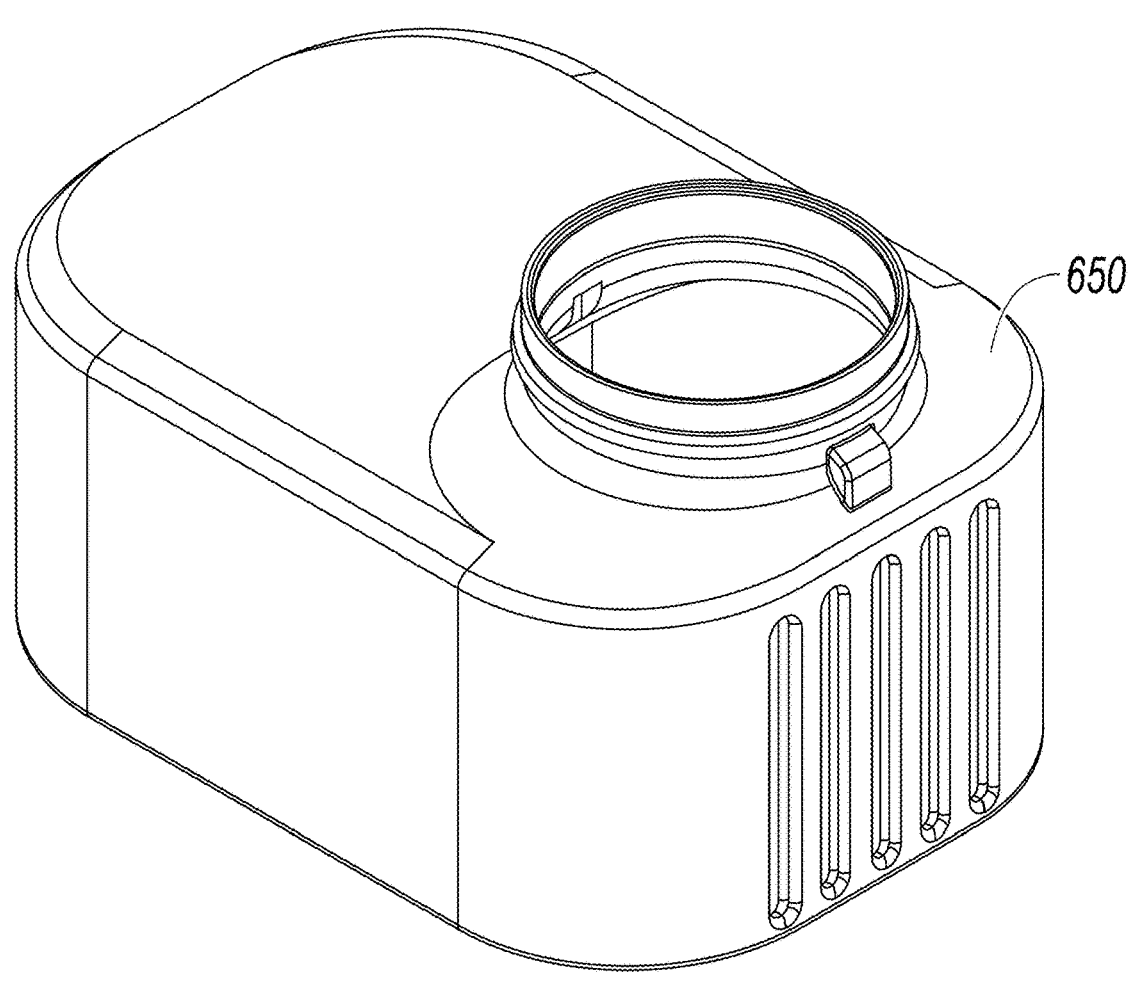
Figure 8B:
FIG. 8B is a perspective view of the housing of FIG. 8A retained in a carriage of a beverage dispensing system.
Figure 8B:
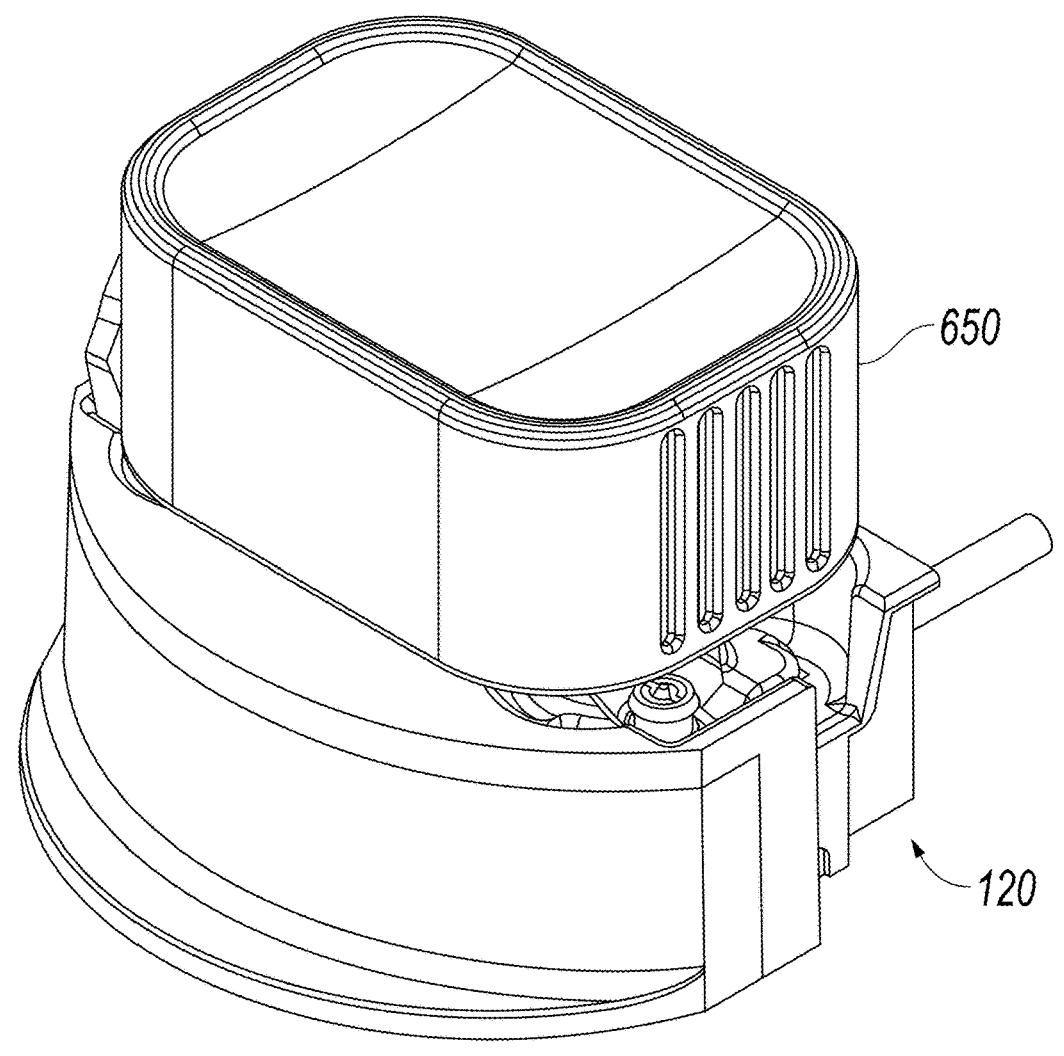

FIGS. 8A and 8B depict another embodiment of an additive container 600 having an extra wide housing 650 according to some variations. The extra wide housing 650 can be seen especially in FIG. 8A, and it may include many of the features described herein with respect to other containers. For brevity, these comparable features will not be described again. The housing 650 may have a large width that extends to occupy additional space across one or more carriages 120, allowing the container 200 to store an increased amount of the additive. The housing 650 has a substantially rounded rectangular shape. While the housing 650 is shown as having a specific form, the housing 650 can take on a variety of forms. This rounded rectangular form can include a minor width about a shorter dimension of the housing 650 and a major width about a longer dimension of housing 650.

As shown in FIG. 8B, when seated with a carriage 120, the container can be configured to extend across an entire upper surface of the carriage 120, while still allowing an interface portion of the container to mate with the carriage.

Certain illustrative implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting illustrative implementations and that the scope of the present invention is defined solely by the claims. The features illustrated or described in connection with one illustrative implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. An additive container, comprising:
a housing defining a hollow interior and having an opening leading to the hollow interior;
a cover disposed over the opening;
an inlet formed in a wall of the housing and leading to the hollow interior, the inlet having an inlet valve movable between open and closed positions for allowing fluid flow into the hollow interior;
an inlet collar disposed around the inlet and extending outward from the wall of the housing;
an outlet formed in the wall of the housing and spaced apart from the inlet, the outlet having an outlet valve movable between open and closed positions for allowing fluid flow out of the hollow interior; and
a first recess and a second recess disposed on opposing sides of the inlet and the outlet, the first and second recesses each having a bat wing form.

2. The additive container of claim 1, wherein the inlet and the outlet are formed in a wall of the housing directly opposite the opening.

3. The additive container of claim 1, wherein the inlet, the outlet, the first recess, and the second recess define a central pattern having a substantially figure-eight shape.

4. The additive container of claim 1, further comprising and outlet collar disposed around the outlet and extending outward from the wall of the housing.

5. The additive container of claim 1, wherein the housing has an ovular form defining a major axis and a minor axis.

6. The additive container of claim 5, wherein the inlet and the outlet are aligned with the minor axis.

7. An additive container, comprising:
a housing defining a hollow interior configured to store at least one additive for a beverage, the housing having an opening leading to the hollow interior;
a lid removably disposed over the opening to close off the hollow interior;

an inlet defined in the housing and having an inlet valve disposed therein, the inlet being configured to receive a pressurized gas to elevate an internal pressure of the hollow interior; and an outlet defined in the housing and having an outlet valve disposed therein, the outlet valve being configured to open in response to the elevated internal pressure of the hollow interior to expel the at least one additive;

wherein the housing has an ovular form defining a major axis and a minor axis; and wherein the inlet and the outlet are aligned with the minor axis.

8. The additive container of claim 7, further comprising at least one recess flanking the inlet and the outlet.

9. The additive container of claim 8, wherein the at least one recess comprises a first recess and a second recess disposed on opposing sides of the inlet and the outlet.

10. The additive container of claim 9, wherein the first recess and the second recess each have a bat wing form.

11. The additive container of claim 9, wherein the inlet, the outlet, the first recess, and the second recess define a central pattern having a substantially figure-eight shape.

12. The additive container of claim 7, further comprising and outlet collar disposed around the outlet and extending outward from the wall of the housing.

* * * * *